United States Patent
Elzur

(10) Patent No.: US 7,929,540 B2
(45) Date of Patent: Apr. 19, 2011

(54) SYSTEM AND METHOD FOR HANDLING OUT-OF-ORDER FRAMES

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/705,688

(22) Filed: Feb. 15, 2010

(65) Prior Publication Data

US 2010/0142534 A1 Jun. 10, 2010

Related U.S. Application Data

(63) Continuation of application No. 12/187,783, filed on Aug. 7, 2008, which is a continuation of application No. 10/651,459, filed on Aug. 29, 2003, now Pat. No. 7,411,959.

(60) Provisional application No. 60/456,260, filed on Mar. 20, 2003, provisional application No. 60/407,165, filed on Aug. 30, 2002.

(51) Int. Cl.
    *H04L 12/56* (2006.01)
(52) U.S. Cl. .......................................... 370/394; 370/412
(58) Field of Classification Search .................. 370/394, 370/412, 235, 389, 392, 419, 463, 351, 428, 370/429, 236
See application file for complete search history.

(56) References Cited

U.S. PATENT DOCUMENTS

| 4,333,020 A | 6/1982 | Maeder |
|---|---|---|
| 4,395,774 A | 7/1983 | Rapp |
| 4,433,378 A | 2/1984 | Leger |
| 4,445,051 A | 4/1984 | Elmasry |
| 4,449,248 A | 5/1984 | Leslie |
| 4,463,424 A | 7/1984 | Mattson |
| 4,519,068 A | 5/1985 | Krebs |
| 4,545,023 A | 10/1985 | Mizzi |

(Continued)

FOREIGN PATENT DOCUMENTS

EP 0465090 B1 4/1996

(Continued)

OTHER PUBLICATIONS

Stevens, W., "TCP Slow Start, Congestion Avoidance, Fast Retransmit and Fast Recovery Algorithms", RFC 2001 (RFC2001), www.faqs.org/rfcs/rfc2001.html, Jan. 1997.

(Continued)

*Primary Examiner* — Brian D Nguyen
(74) *Attorney, Agent, or Firm* — McAndrews, Held & Malloy, Ltd.

(57) ABSTRACT

A system for reordering frames may include at least one processor that enable receiving of an out-of-order frame via a network subsystem. The at least one processor may enable placing data of the out-of-order frame in a host memory, and managing information relating to one or more holes resulting from the out-of-order frame in a receive window. The at least one processor may enable setting a programmable limit with respect to a number of holes allowed in the receive window. The out-of-order frame is received via a TCP offload engine (TOE) of the network subsystem or a TCP-enabled Ethernet controller (TEEC) of the network subsystem. The network subsystem may not store the out-of-order frame on an onboard memory, and may not store one or more missing frames relating to the out-of-order frame. The network subsystem may include a network interface card (NIC).

22 Claims, 16 Drawing Sheets

U.S. PATENT DOCUMENTS

| | | |
|---|---|---|
| 4,590,550 A | 5/1986 | Eilert |
| 4,599,526 A | 7/1986 | Paski |
| 4,649,293 A | 3/1987 | Ducourant |
| 4,680,787 A | 7/1987 | Marry |
| 4,717,838 A | 1/1988 | Brehmer |
| 4,721,866 A | 1/1988 | Chi |
| 4,727,309 A | 2/1988 | Vajdic |
| 4,737,975 A | 4/1988 | Shafer |
| 4,760,571 A | 7/1988 | Schwarz |
| 4,761,822 A | 8/1988 | Maile |
| 4,777,657 A | 10/1988 | Gillaspie |
| 4,791,324 A | 12/1988 | Hodapp |
| 4,794,649 A | 12/1988 | Fujiwara |
| 4,804,954 A | 2/1989 | Macnak |
| 4,806,796 A | 2/1989 | Bushey |
| 4,807,282 A | 2/1989 | Kazan |
| 4,817,054 A | 3/1989 | Banerjee |
| 4,817,115 A | 3/1989 | Campo |
| 4,821,034 A | 4/1989 | Anderson |
| 4,850,009 A | 7/1989 | Zook |
| 4,890,832 A | 1/1990 | Komaki |
| 4,894,792 A | 1/1990 | Mitchell |
| 4,916,441 A | 4/1990 | Gombrich |
| 4,964,121 A | 10/1990 | Moore |
| 4,969,206 A | 11/1990 | Desrochers |
| 4,970,406 A | 11/1990 | Fitzpatrick |
| 4,977,611 A | 12/1990 | Maru |
| 4,995,099 A | 2/1991 | Davis |
| 5,008,879 A | 4/1991 | Fischer |
| 5,025,486 A | 6/1991 | Klughart |
| 5,029,183 A | 7/1991 | Tymes |
| 5,031,231 A | 7/1991 | Miyazaki |
| 5,033,109 A | 7/1991 | Kawano |
| 5,041,740 A | 8/1991 | Smith |
| 5,055,659 A | 10/1991 | Hendrick |
| 5,055,660 A | 10/1991 | Bertagna |
| 5,079,452 A | 1/1992 | Lain |
| 5,081,402 A | 1/1992 | Koleda |
| 5,087,099 A | 2/1992 | Stolarczyk |
| 5,115,151 A | 5/1992 | Hull |
| 5,117,501 A | 5/1992 | Childress |
| 5,119,502 A | 6/1992 | Kallin |
| 5,121,408 A | 6/1992 | Cai |
| 5,122,689 A | 6/1992 | Barre |
| 5,123,029 A | 6/1992 | Bantz |
| 5,128,938 A | 7/1992 | Borras |
| 5,134,347 A | 7/1992 | Koleda |
| 5,142,573 A | 8/1992 | Umezawa |
| 5,149,992 A | 9/1992 | Allstot |
| 5,150,361 A | 9/1992 | Wieczorek |
| 5,152,006 A | 9/1992 | Klaus |
| 5,153,878 A | 10/1992 | Krebs |
| 5,162,674 A | 11/1992 | Allstot |
| 5,175,870 A | 12/1992 | Mabey |
| 5,177,378 A | 1/1993 | Nagasawa |
| 5,179,721 A | 1/1993 | Comroe |
| 5,181,200 A | 1/1993 | Harrison |
| 5,196,805 A | 3/1993 | Beckwith |
| 5,216,295 A | 6/1993 | Hoang |
| 5,230,084 A | 7/1993 | Nguyen |
| 5,239,662 A | 8/1993 | Danielson |
| 5,241,542 A | 8/1993 | Natarajan |
| 5,241,691 A | 8/1993 | Owen |
| 5,247,656 A | 9/1993 | Kabuo |
| 5,249,220 A | 9/1993 | Moskowitz |
| 5,249,302 A | 9/1993 | Metroka |
| 5,265,238 A | 11/1993 | Canova |
| 5,265,270 A | 11/1993 | Stengel |
| 5,274,666 A | 12/1993 | Dowdell |
| 5,276,680 A | 1/1994 | Messenger |
| 5,278,831 A | 1/1994 | Mabey |
| 5,289,055 A | 2/1994 | Razavi |
| 5,289,469 A | 2/1994 | Tanaka |
| 5,291,516 A | 3/1994 | Dixon |
| 5,293,639 A | 3/1994 | Wilson |
| 5,296,849 A | 3/1994 | Ide |
| 5,297,144 A | 3/1994 | Gilbert |
| 5,301,196 A | 4/1994 | Ewen |
| 5,304,869 A | 4/1994 | Greason |
| 5,315,591 A | 5/1994 | Brent |
| 5,323,392 A | 6/1994 | Ishii |
| 5,329,192 A | 7/1994 | Wu |
| 5,331,509 A | 7/1994 | Kikinis |
| 5,345,449 A | 9/1994 | Buckingham |
| 5,349,649 A | 9/1994 | Iijima |
| 5,355,453 A | 10/1994 | Row |
| 5,361,397 A | 11/1994 | Wright |
| 5,363,121 A | 11/1994 | Freund |
| 5,373,149 A | 12/1994 | Rasmussen |
| 5,373,506 A | 12/1994 | Tayloe |
| 5,390,206 A | 2/1995 | Rein |
| 5,392,023 A | 2/1995 | D'Avello |
| 5,406,615 A | 4/1995 | Miller |
| 5,406,643 A | 4/1995 | Burke |
| 5,418,837 A | 5/1995 | Johansson |
| 5,420,529 A | 5/1995 | Guay |
| 5,423,002 A | 6/1995 | Hart |
| 5,426,637 A | 6/1995 | Derby |
| 5,428,636 A | 6/1995 | Meier |
| 5,430,845 A | 7/1995 | Rimmer |
| 5,432,932 A | 7/1995 | Chen |
| 5,434,518 A | 7/1995 | Sinh |
| 5,437,329 A | 8/1995 | Brooks |
| 5,440,560 A | 8/1995 | Rypinski |
| 5,455,527 A | 10/1995 | Murphy |
| 5,457,412 A | 10/1995 | Tamba |
| 5,459,412 A | 10/1995 | Mentzer |
| 5,465,081 A | 11/1995 | Todd |
| 5,473,607 A | 12/1995 | Hausman |
| 5,481,265 A | 1/1996 | Russell |
| 5,481,562 A | 1/1996 | Pearson |
| 5,488,319 A | 1/1996 | Lo |
| 5,502,719 A | 3/1996 | Grant |
| 5,510,734 A | 4/1996 | Sone |
| 5,510,748 A | 4/1996 | Erhart |
| 5,519,695 A | 5/1996 | Purohit |
| 5,521,530 A | 5/1996 | Yao |
| 5,533,029 A | 7/1996 | Gardner |
| 5,535,373 A | 7/1996 | Olnowich |
| 5,541,994 A | 7/1996 | Tomko et al. |
| 5,544,222 A | 8/1996 | Robinson |
| 5,548,230 A | 8/1996 | Gerson |
| 5,548,238 A | 8/1996 | Zhang |
| 5,550,491 A | 8/1996 | Furuta |
| 5,576,644 A | 11/1996 | Pelella |
| 5,579,487 A | 11/1996 | Meyerson |
| 5,583,456 A | 12/1996 | Kimura |
| 5,584,048 A | 12/1996 | Wieczorek |
| 5,588,000 A | 12/1996 | Rickard |
| 5,600,267 A | 2/1997 | Wong |
| 5,603,051 A | 2/1997 | Ezzet |
| 5,606,268 A | 2/1997 | Van Brunt |
| 5,619,497 A | 4/1997 | Gallagher |
| 5,619,650 A | 4/1997 | Bach |
| 5,625,308 A | 4/1997 | Matsumoto |
| 5,628,055 A | 5/1997 | Stein |
| 5,630,061 A | 5/1997 | Richter |
| 5,640,356 A | 6/1997 | Gibbs |
| 5,640,399 A | 6/1997 | Rostoker |
| 5,668,809 A | 9/1997 | Rostoker |
| 5,675,584 A | 10/1997 | Jeong |
| 5,675,585 A | 10/1997 | Bonnot |
| 5,680,038 A | 10/1997 | Fiedler |
| 5,680,633 A | 10/1997 | Koenck |
| 5,689,644 A | 11/1997 | Chou |
| 5,724,361 A | 3/1998 | Fiedler |
| 5,726,588 A | 3/1998 | Fiedler |
| 5,732,346 A | 3/1998 | Lazaridia |
| 5,740,366 A | 4/1998 | Mahany |
| 5,742,604 A | 4/1998 | Edsall |
| 5,744,366 A | 4/1998 | Kricka |
| 5,744,999 A | 4/1998 | Kim |
| 5,748,631 A | 5/1998 | Bergantino |
| 5,754,549 A | 5/1998 | DeFoster |
| 5,767,699 A | 6/1998 | Bosnyak |
| 5,778,414 A | 7/1998 | Winter |
| 5,796,727 A | 8/1998 | Harrison |

| | | | |
|---|---|---|---|
| 5,798,658 A | 8/1998 | Werking |
| 5,802,258 A | 9/1998 | Chen |
| 5,802,287 A | 9/1998 | Rostoker |
| 5,802,465 A | 9/1998 | Hamalainen |
| 5,802,576 A | 9/1998 | Tzeng |
| 5,805,927 A | 9/1998 | Bowes |
| 5,821,809 A | 10/1998 | Boerstler |
| 5,826,027 A | 10/1998 | Pedersen |
| 5,828,653 A | 10/1998 | Goss |
| 5,829,025 A | 10/1998 | Mittal |
| 5,831,985 A | 11/1998 | Sandorfi |
| 5,839,051 A | 11/1998 | Grimmett |
| 5,844,437 A | 12/1998 | Asazawa |
| 5,848,251 A | 12/1998 | Lomelino |
| 5,859,669 A | 1/1999 | Prentice |
| 5,861,881 A | 1/1999 | Freeman |
| 5,875,465 A | 2/1999 | Kilpatrick |
| 5,877,642 A | 3/1999 | Takahashi |
| 5,887,146 A | 3/1999 | Baxter |
| 5,887,187 A | 3/1999 | Rostoker |
| 5,892,382 A | 4/1999 | Ueda |
| 5,892,922 A | 4/1999 | Lorenz |
| 5,893,150 A | 4/1999 | Hagersten |
| 5,893,153 A | 4/1999 | Tzeng |
| 5,903,176 A | 5/1999 | Westgate |
| 5,905,386 A | 5/1999 | Gerson |
| 5,908,468 A | 6/1999 | Hartmann |
| 5,909,127 A | 6/1999 | Pearson |
| 5,909,686 A | 6/1999 | Muller |
| 5,914,955 A | 6/1999 | Rostoker |
| 5,937,169 A | 8/1999 | Connery |
| 5,940,771 A | 8/1999 | Gollnick |
| 5,945,847 A | 8/1999 | Ransijn |
| 5,945,858 A | 8/1999 | Sato |
| 5,945,863 A | 8/1999 | Coy |
| 5,961,631 A | 10/1999 | Devereux |
| 5,969,556 A | 10/1999 | Hayakawa |
| 5,974,508 A | 10/1999 | Maheshwari |
| 5,977,800 A | 11/1999 | Iravani |
| 5,978,379 A | 11/1999 | Chan |
| 5,978,849 A | 11/1999 | Khanna |
| 5,987,507 A | 11/1999 | Creedon |
| 6,002,279 A | 12/1999 | Evans |
| 6,008,670 A | 12/1999 | Pace |
| 6,014,041 A | 1/2000 | Somasekhar |
| 6,014,705 A | 1/2000 | Koenck |
| 6,025,746 A | 2/2000 | So |
| 6,026,075 A | 2/2000 | Linville |
| 6,028,454 A | 2/2000 | Elmasry |
| 6,037,841 A | 3/2000 | Tanji |
| 6,037,842 A | 3/2000 | Bryan |
| 6,038,254 A | 3/2000 | Ferraiolo |
| 6,061,351 A | 5/2000 | Erimli |
| 6,061,747 A | 5/2000 | Ducaroir |
| 6,064,626 A | 5/2000 | Stevens |
| 6,081,162 A | 6/2000 | Johnson |
| 6,094,074 A | 7/2000 | Chi |
| 6,098,064 A | 8/2000 | Piroll |
| 6,104,214 A | 8/2000 | Ueda |
| 6,111,425 A | 8/2000 | Bertin |
| 6,111,859 A | 8/2000 | Godfrey |
| 6,114,843 A | 9/2000 | Olah |
| 6,118,776 A | 9/2000 | Berman |
| 6,122,667 A | 9/2000 | Chung |
| 6,141,705 A | 10/2000 | Anand |
| 6,151,662 A | 11/2000 | Christie |
| 6,157,623 A | 12/2000 | Kerstein |
| 6,178,159 B1 | 1/2001 | He |
| 6,185,185 B1 | 2/2001 | Bass |
| 6,188,339 B1 | 2/2001 | Hasegawa |
| 6,194,950 B1 | 2/2001 | Kibar |
| 6,202,125 B1 | 3/2001 | Patterson |
| 6,202,129 B1 | 3/2001 | Palanca |
| 6,209,020 B1 | 3/2001 | Angie |
| 6,215,497 B1 | 4/2001 | Leung |
| 6,218,878 B1 | 4/2001 | Ueno |
| 6,222,380 B1 | 4/2001 | Gerowitz |
| 6,223,239 B1 | 4/2001 | Olarig |
| 6,226,680 B1 | 5/2001 | Boucher |
| 6,232,844 B1 | 5/2001 | Talaga |
| 6,243,386 B1 | 6/2001 | Chan |
| 6,247,060 B1 | 6/2001 | Boucher |
| 6,259,312 B1 | 7/2001 | Murtojarvi |
| 6,265,898 B1 | 7/2001 | Bellaouar |
| 6,266,797 B1 | 7/2001 | Godfrey |
| 6,269,427 B1 | 7/2001 | Kuttanna |
| 6,279,035 B1 | 8/2001 | Brown |
| 6,310,501 B1 | 10/2001 | Yamashita |
| 6,324,181 B1 | 11/2001 | Wung |
| 6,332,179 B1 | 12/2001 | Okpisz |
| 6,334,153 B2 | 12/2001 | Boucher |
| 6,345,301 B1 | 2/2002 | Burns |
| 6,349,098 B1 | 2/2002 | Purruck |
| 6,349,365 B1 | 2/2002 | McBride |
| 6,356,944 B1 | 3/2002 | McCarty |
| 6,363,011 B1 | 3/2002 | Hirose |
| 6,366,583 B2 | 4/2002 | Rowett |
| 6,373,846 B1 | 4/2002 | Daniel |
| 6,374,311 B1 | 4/2002 | Mahany |
| 6,385,201 B1 | 5/2002 | Iwata |
| 6,389,479 B1 | 5/2002 | Boucher |
| 6,396,832 B1 | 5/2002 | Kranzler |
| 6,396,840 B1 | 5/2002 | Rose |
| 6,411,621 B1 | 6/2002 | Norton et al. |
| 6,424,194 B1 | 7/2002 | Hairapetian |
| 6,424,624 B1 | 7/2002 | Galand |
| 6,427,169 B1 | 7/2002 | Elzur |
| 6,427,171 B1 | 7/2002 | Craft |
| 6,427,173 B1 | 7/2002 | Boucher |
| 6,434,620 B1 | 8/2002 | Boucher et al. |
| 6,438,651 B1 | 8/2002 | Slane |
| 6,449,656 B1 | 9/2002 | Elzur |
| 6,459,681 B1 | 10/2002 | Oliva |
| 6,463,092 B1 | 10/2002 | Kim |
| 6,470,029 B1 | 10/2002 | Shimizu |
| 6,484,224 B1 | 11/2002 | Robins |
| 6,496,479 B1 | 12/2002 | Shionazaki |
| 6,496,481 B1 | 12/2002 | Wu et al. |
| 6,535,518 B1 | 3/2003 | Hu et al. |
| 6,538,486 B1 | 3/2003 | Chen |
| 6,564,267 B1 | 5/2003 | Lindsay |
| 6,597,689 B1 | 7/2003 | Chiu |
| 6,606,321 B1 | 8/2003 | Natanson |
| 6,614,791 B1 | 9/2003 | Luciani |
| 6,614,796 B1 | 9/2003 | Black |
| 6,631,351 B1 | 10/2003 | Ramachandran |
| 6,633,936 B1 | 10/2003 | Keller |
| 6,636,947 B1 | 10/2003 | Neal |
| 6,658,599 B1 | 12/2003 | Linam |
| 6,665,759 B2 | 12/2003 | Dawkins |
| 6,681,283 B1 | 1/2004 | Thekkath et al. |
| 6,697,868 B2 | 2/2004 | Craft |
| 6,757,291 B1 | 6/2004 | Hu |
| 6,757,746 B2 | 6/2004 | Boucher |
| 6,765,901 B1 | 7/2004 | Johnson |
| 6,766,389 B2 | 7/2004 | Hayter |
| 6,788,686 B1 | 9/2004 | Khotimsky |
| 6,788,704 B1 | 9/2004 | Lindsay |
| 6,816,932 B2 | 11/2004 | Cho |
| 6,845,403 B2 | 1/2005 | Chadalapaka |
| 6,850,521 B1 | 2/2005 | Kadambi |
| 6,859,435 B1 | 2/2005 | Lee |
| 6,862,296 B1 | 3/2005 | Desai |
| 6,865,158 B2 | 3/2005 | Iwamoto |
| 6,874,054 B2 | 3/2005 | Clayton |
| 6,897,697 B2 | 5/2005 | Yin |
| 6,904,519 B2 | 6/2005 | Anand |
| 6,911,855 B2 | 6/2005 | Yin |
| 6,912,603 B2 | 6/2005 | Kanazashi |
| 6,927,606 B2 | 8/2005 | Kocaman |
| 6,937,080 B2 | 8/2005 | Hairapetian |
| 6,938,092 B2 | 8/2005 | Burns |
| 6,971,006 B2 | 11/2005 | Krishna |
| 6,976,205 B1 | 12/2005 | Ziai |
| 6,982,583 B2 | 1/2006 | Yin |
| 7,007,103 B2 | 2/2006 | Pinkerton |
| 7,009,985 B2 | 3/2006 | Black |
| 7,149,819 B2 | 12/2006 | Petty |

| | | |
|---|---|---|
| 7,159,030 B1 | 1/2007 | Elzur |
| 7,181,531 B2 | 2/2007 | Pinkerton |
| 7,185,266 B2 | 2/2007 | Blightman |
| 7,212,534 B2 | 5/2007 | Kadambi |
| 7,346,701 B2 | 3/2008 | Elzur |
| 7,362,769 B2 | 4/2008 | Black |
| 7,366,190 B2 | 4/2008 | Black |
| 7,376,755 B2 | 5/2008 | Pandya |
| 7,382,790 B2 | 6/2008 | Warren |
| 7,385,972 B2 | 6/2008 | Black |
| 7,397,788 B2 | 7/2008 | Mies |
| 7,397,800 B2 | 7/2008 | Elzur |
| 7,400,639 B2 | 7/2008 | Madukkarumukumana |
| 7,411,959 B2 | 8/2008 | Elzur |
| 7,430,171 B2 | 9/2008 | Black |
| 7,472,156 B2 | 12/2008 | Philbrick |
| 7,515,612 B1 | 4/2009 | Thompson |
| 7,586,850 B2 | 9/2009 | Warren |
| 7,644,188 B2 | 1/2010 | Vlodavsky |
| 2001/0026553 A1 | 10/2001 | Gallant |
| 2001/0037397 A1 | 11/2001 | Boucher |
| 2002/0034182 A1 | 3/2002 | Mallory |
| 2002/0062333 A1 | 5/2002 | Anand |
| 2002/0078265 A1 | 6/2002 | Frazier |
| 2002/0085562 A1 | 7/2002 | Hufferd |
| 2002/0089927 A1 | 7/2002 | Fischer |
| 2002/0095519 A1 | 7/2002 | Philbrick |
| 2002/0103988 A1 | 8/2002 | Dornier |
| 2002/0118692 A1* | 8/2002 | Oberman et al. ............ 370/419 |
| 2002/0130692 A1 | 9/2002 | Hairapetian |
| 2002/0174253 A1 | 11/2002 | Hayter |
| 2002/0190770 A1 | 12/2002 | Yin |
| 2002/0191604 A1 | 12/2002 | Mitchell et al. |
| 2002/0194400 A1 | 12/2002 | Porterfield |
| 2002/0194445 A1 | 12/2002 | Zsohar |
| 2003/0001646 A1 | 1/2003 | Hairapetian |
| 2003/0016628 A1 | 1/2003 | Kadambi |
| 2003/0021229 A1 | 1/2003 | Kadambi |
| 2003/0026277 A1* | 2/2003 | Pate et al. .................. 370/412 |
| 2003/0038809 A1 | 2/2003 | Peng |
| 2003/0046330 A1 | 3/2003 | Hayes |
| 2003/0046418 A1 | 3/2003 | Raval |
| 2003/0051128 A1 | 3/2003 | Rodriguez |
| 2003/0061505 A1 | 3/2003 | Sperry |
| 2003/0067337 A1 | 4/2003 | Yin |
| 2003/0079033 A1 | 4/2003 | Craft |
| 2003/0084185 A1 | 5/2003 | Pinkerton |
| 2003/0105977 A1 | 6/2003 | Brabson |
| 2003/0107996 A1 | 6/2003 | Black |
| 2003/0108045 A1* | 6/2003 | Jayam et al. ............... 370/394 |
| 2003/0108050 A1 | 6/2003 | Black |
| 2003/0108058 A1 | 6/2003 | Black |
| 2003/0108060 A1 | 6/2003 | Black |
| 2003/0108061 A1 | 6/2003 | Black |
| 2003/0118040 A1 | 6/2003 | Black |
| 2003/0123447 A1* | 7/2003 | Smith ........................ 370/394 |
| 2003/0128704 A1* | 7/2003 | Mizrachi et al. ........... 370/394 |
| 2003/0140124 A1 | 7/2003 | Burns |
| 2003/0169753 A1 | 9/2003 | Black |
| 2003/0172342 A1 | 9/2003 | Elzur |
| 2003/0174720 A1 | 9/2003 | Black |
| 2003/0174721 A1 | 9/2003 | Black |
| 2003/0174722 A1 | 9/2003 | Black |
| 2003/0198251 A1 | 10/2003 | Black |
| 2003/0204631 A1 | 10/2003 | Pinkerton |
| 2003/0204634 A1 | 10/2003 | Pinkerton |
| 2004/0019652 A1 | 1/2004 | Freimuth |
| 2004/0042458 A1 | 3/2004 | Elzur |
| 2004/0042464 A1 | 3/2004 | Elzur |
| 2004/0042483 A1 | 3/2004 | Elzur |
| 2004/0042487 A1 | 3/2004 | Ossman |
| 2004/0044798 A1 | 3/2004 | Elzur |
| 2004/0062245 A1 | 4/2004 | Sharp |
| 2004/0062275 A1 | 4/2004 | Siddabathuni |
| 2004/0081186 A1 | 4/2004 | Warren |
| 2004/0085972 A1 | 5/2004 | Warren |
| 2004/0085994 A1 | 5/2004 | Warren |
| 2004/0093411 A1 | 5/2004 | Elzur |
| 2004/0133713 A1 | 7/2004 | Elzur |
| 2004/0227544 A1 | 11/2004 | Yin |
| 2005/0027911 A1 | 2/2005 | Hayter |
| 2005/0160139 A1 | 7/2005 | Boucher |
| 2005/0165980 A1 | 7/2005 | Clayton |
| 2005/0184765 A1 | 8/2005 | Hairapetian |
| 2005/0185654 A1 | 8/2005 | Zadikian |
| 2005/0216597 A1 | 9/2005 | Shah |
| 2005/0278459 A1 | 12/2005 | Boucher |
| 2006/0165115 A1 | 7/2006 | Warren |
| 2006/0176094 A1 | 8/2006 | Hairapetian |
| 2007/0170966 A1 | 7/2007 | Hairapetian |
| 2007/0171914 A1 | 7/2007 | Kadambi |
| 2007/0237163 A1 | 10/2007 | Kadambi |
| 2008/0025315 A1 | 1/2008 | Elzur |
| 2008/0095182 A1 | 4/2008 | Elzur |
| 2008/0151922 A1 | 6/2008 | Elzur |
| 2008/0205421 A1 | 8/2008 | Black |
| 2008/0276018 A1 | 11/2008 | Hayter |
| 2008/0298369 A1 | 12/2008 | Elzur |
| 2009/0074408 A1 | 3/2009 | Black |
| 2009/0128380 A1 | 5/2009 | Hairapetian |

FOREIGN PATENT DOCUMENTS

| | | |
|---|---|---|
| EP | 0692892 B1 | 4/2003 |
| EP | 1345382 A2 | 9/2003 |
| EP | 1357721 A2 | 10/2003 |
| EP | 1460804 A2 | 9/2004 |
| EP | 1460805 A2 | 9/2004 |
| EP | 1460806 A2 | 9/2004 |
| EP | 1206075 B1 | 11/2007 |
| EP | 1537695 B1 | 2/2009 |
| FR | 2 598 531 | 11/1987 |
| FR | 2725573 A1 | 11/1994 |
| FR | 19940012105 | 4/1996 |
| GB | 2 320 592 | 6/1998 |
| JP | 1188301 | 7/1989 |
| JP | 6232872 | 8/1994 |
| JP | 9006691 | 1/1997 |
| WO | WO99/00948 | 1/1999 |
| WO | WO00/56013 | 9/2000 |
| WO | 01/92997 A2 | 12/2001 |
| WO | 02/19604 A2 | 3/2002 |
| WO | WO02/35784 | 5/2002 |
| WO | WO03/079612 | 9/2003 |

OTHER PUBLICATIONS

Communication pursuant to Article 94(3) EPC for European Patent Application No. 08 002 749.3-1245, dated Feb. 22, 2010.

Ewen, "Single-Chip 1062 Mbaud CMOS Transceiver for Serial Data communication", 1995 IEEE International Solid-State Circuits Conference, Digest of Technical Papers, First Edition, Feb. 1995, pp. 1-2, 6-13, 32-33, 336, IEEE Catalog No. 95CH35753, Publisher: John H. Wuorinen, Castine, ME 04421.

Fiedler, "A 1.0625Gbps Transceiver with 2x-Oversampling and Transmit Signal Pre-Emphasis", 1997 IEEE International Solid-State Circuits Conference, Digest of Technical Papers, ISSCC97, Session 15, Serial Data Communications, Paper FP 15.1, pp. 238-239, 464.

Fujimori, "A 90-dB SNR 2.5-MHz Output-Rate ADC Using Cascaded Multibit Delta-Sigma Modulation at 8x Oversampling Ratio", IEEE Journal of Solid-State Circuits, vol. 35, No. 12, Dec. 2000, pp. 1820-1828.

Corner, "A CMOS Phase Detector for Mixed Signal ASIC Application", IEEE, 1993, pp. 232-234.

Fiedler, "A CMOS Pulse Density Modulator for High-Resolution A/D Converters", IEEE Journal of Solid-State Circuits, vol. sc-19, No. 6, Dec. 1984, pp. 995-996.

Momtaz, "A Fully Integrated SONET OC-48 Transceiver in Standard CMOS", IEEE Journal of Solid-State Circuits, vol. 36, No. 12, Dec. 2001, pp. 1964-1973.

Schmitt, "A Low Voltage CMOS Current Source", pp. 110-113.

Hairapetian, "An 81-MHz IF Receiver in CMOS", IEEE Journal of Solid-State Circuits, vol. 31, No. 12, Dec. 1996, pp. 1981-1986.

Ang, "An Evaluation of an Attempt at Offloading TCP/IP Protocol Processing Onto An i960RN-Based iNIC", Hewlett Packard, 2001, pp. 1-33.

Fischer, "CiNIC-Calpoly Intelligent NIC", A Thesis Presented to the Faculty of California Polytechnic State University, San Luis Obispo, Jun. 2001, pp. i-xi, 1-137.

Tanenbaum, Excerpt from Computer Networks, Third Edition, 1996, Publisher: Prentice Hall PTF, Upper Saddle River, New Jersey 07458, pp. 556-558.

Allstot, "Current-Mode Logic Techniques for CMOS Mixed-Mode ASIC's", IEEE Custom Integrated Circuits Conference, 1991, pp. 25.2.1-25.2.4.

Shivam, "EMP: Zero-copy OS-bypass NIC-Driven Gigabit Ethernet Message Passing", SC1001 Nov. 2001, Denver, CO.

Nayfeh, "Exploring the Design Space for a Shared-Cache Multiprocessor", Computer Systems Laboratory, Stanford University, IEEE, 1994, pp. 166-175.

Fibre Channel Arbitration Loop (FC-AL), X3.262-199x, X3T11/Project 960D/Rev. 4.5, working draft proposal, American National Standard for Information Technology, Jun. 1,1995, pp. i-x, 1-92.

Fibre Channel Physical and Signaling Interface (FC-PH), X3.230-199x, X3T11 Project 755D/Rev. 4.3, working draft proposal, American National Standard for Information Systems, Jun. 1, 1994, pp. i-xxxiv, 1-338, Index.

Yeh, "Introduction to TCP/IP Offload Engine (TOA)", 10 Gigabit Ethernet Alliance, Version 1.0, Apr. 2002.

Sanchez, "Iterations in TCP/IP—Ethernet Network Optimization", a Master's thesis presented to the Faculty of California, Polytechnic State University, San Luis Obispo, Jun. 1999, pp. i-xiii, 1-156.

Allam, "Low Power CMOS Logic Families", IEEE, 1999, pp. 419-422.

Hairapetian, "Low-Temperature Mobility Measurements On CMOS Devices", IEEE Transactions on Electron Devices, vol. 36, No. 8, Aug. 1989, pp. 1448-1455.

Cao, "OC-192 Transmitter and Receiver in Standard 0.18-um CMOS", IEEE Journal of Solid-State Circuits, vol. 37, No. 12, Dec. 2002, pp. 1768-1780.

Series H: Audiovisual and Multimedia Systems, Infrastructure of Audiovisual Services—Systems and Terminal Equipment for Audiovisual Services; Visual Telephone Systems and Equipment for Local Area Networks Which Provide a Non-Guaranteed Quality of Serives, ITU-T Recommendation H.323, Superseded by a more recent version, Nov. 1996, pp. i-v, 1-71, 1.

Pinkerton, "The Case for RDMA", May 29, 2002, pp. 1-27.

Pope, "Tip of the Week: Net-Interface Accelerators Can Help or Hinder", Network Systems Design Line, Feb. 26, 2007, http://www.networksystemsdesignline.com, pp. 1-2.

Dally, "Virtual-Channel Flow Control", IEEE Transactions on Parallel and Distributed Systems, vol. 3, No. 2, Mar. 1992, pp. 194-205.

Emulex Corporation's Answer, Affirmative Defenses, And Counterclaims, Demand for Jury Trial, *Broadcom Corporation* vs. *Emulex Corporation*, Case No. SACV 09-1058-JVS (ANx), Nov. 4, 2009.

RFC 793, Transmission Control Protocol, DRPA Internet Program, Protocol Specification, Sep. 1981.

Koufopavlou, Odysseas G., and Zitterbart, Martina, Parallel TCP for High Performance Communication System, Globecom '92, IEEE Global Telecommunications Conference, Orlando, FL, Dec. 6-9,1992, pp. 1395-1399.

MacLean, R. Andrew, and Barvick, Scott E., An Outboard Processor for High Performance Implementation of Transport Layer Protocols, IEEE Global Telecommunications Conference, Phoenix, AZ, Dec. 2-5, 1991, pp. 1728-1732.

User's Guide: Alacritech 1000×4 Quad-Port Server Adapter, Alacritech 100×2 Dual-Port Server Adapter, Alacritech 100×1 Single-Port Server Adapter (4th ed.) (900006r7f), Nov. 2000.

Alacritech 100×4 Quad-Port Server Adapter (Model #2000-100000)[on sale and public use by 2000].

Hardware Installation Guide: Alacritech 100×4 Quad-Port Server Adapter.

Alacritech: Company Milestones.

Alacritech Press Release: Alacritech Ships Industry's First Gigabit Ethernet Accelerator, Oct. 22, 2001.

Raut, Abhay, Verification of a Transport Offload Engine, Dec. 2002.

Gallatin, Andrew, Chase, Jeff, and Yocum, Ken, Trapeze/IP: TCP/IP at Near-Gigabit Speeds, Proceedings of the FREENIX Track: 1999 USENIX Annual Technical Conference, Monterey, CA, Jun. 6-11, 1999.

Buonadonna, Phil, and Culler, David, Queue-Pair IP: A Hybrid Architecture for System Area Networks, Copyright 2002 Intel Corporation, IRB-TR-02-002, Mar. 2002.

Kaiserswerth, Matthias, The Parallel Protocol Engine, IBM Research Division, Zurich Research Laboratory, Switzerland, undated.

Xiao, Xipeng and Lionel, M.Ni, Parallel Routing Table Computation for Scalable IP Routers, undated.

Dunkels, Adam, Minimal TCP/IP Implementation with Proxy Support, SICS Technical Report, ISSN 1100-3154, ISRN: SICS-T-2001/20-SE, Feb. 2001.

Sarkar, Prasenjit and Voruganti, Kaladhar, IP Storage: The Challenge Ahead, IBM Almaden Research Center, San Jose, CA, undated.

Chase, Jeffrey S., Gallatin, Andrew J., and Yocum, Kenneth G., End-System Optimizations for High-Speed TCP, Duke University, Durham, NC, undated.

Wright & Stevens, TCP/IP Illustrated, vol. 2: The Implementation, Corporate Professional Publishing Group, Reading MA 01867, ISBN 0-201-63354-X, 1995, pp. 803-805.

Wright & Stevens, TCP/IP Illustrated, vol. 2: The Implementation, Corporate Professional Publishing Group, Reading MA 01867, ISBN 0-201-63354-X, 1995, pp. 817-818.

Wright & Stevens, TCP/IP Illustrated, vol. 2: The Implementation, Corporate Professional Publishing Group, Reading MA 01867, ISBN 0-201-63354-X, 1995, pp. 790-840.

Ang, An Evaluation of an Attempt at Offloading TCP/IP Protocol Processing Onto An i960RN-based iNIC, Hewlett Packard, Jan. 9, 2001.

Defendant Emulex Corporation's Disclosure of Preliminary Invalidity Contentions, with Exhibit F, *Broadcom Corporation* vs. *Emulex Corporation*, Case No. SACV 09-1058-JVS (ANx), Jun. 28, 2010.

Defendant Emulex Corporation's First Amended Disclosure of Preliminary Invalidity Contentions, with Exhibit E, *Broadcom Corporation* vs. *Emulex Corporation*, Case No. SACV 09-1058-JVS (ANx), Aug. 30, 2010.

User's Guide: Alacritech 100×4 Quad-Port Server Adapter and Alacritech 100×2 Dual-Port Server Adapter, (Bates Nos. ELX-PAT-00045223-ELX-PAT-00045268).

* cited by examiner

SYSTEM AND METHOD FOR HANDLING OUT-OF-ORDER FRAMES

CROSS-REFERENCE TO RELATED APPLICATIONS/INCORPORATION BY REFERENCE

This application is a continuation of U.S. patent application Ser. No. 12/187,783 filed Aug. 7, 2008, which is a continuation of U.S. patent application Ser. No. 10/651,459 (now U.S. Pat. No. 7,411,959) filed Aug. 29, 2003, which makes reference to, claims priority to, and claims benefit from:
U.S. Provisional Patent Application Ser. No. 60/456,260, entitled "System and Method for Handling Out-of-Order Frames" filed on Mar. 20, 2003; and
U.S. Provisional Patent Application Ser. No. 60/407,165, filed on Aug. 30, 2002.

The present application is related to the following application, which is incorporated herein by reference in its entirety for all purposes:
U.S. patent application Ser. No. 10/652,270 (now U.S. Pat. No. 7,397,800), entitled "Method and System Data Placement of Out-Of-Order Frames" filed on Aug. 29, 2003.

The above stated applications are hereby incorporated herein by reference in their entirety.

FIELD OF THE INVENTION

Certain embodiments of the invention relate generally to the processing of transmission packets, segments or frames. More specifically, certain embodiments of the invention relate to a method and system for handling out-of-order (OOO) frames.

BACKGROUND OF THE INVENTION

Conventional transmission control protocol/internet protocol (TCP/IP) offload engines residing on network interface cards (NICs) or elsewhere in a system such as in system software stacks, may inefficiently handle out-of-order (OOO) transmission control protocol (TCP) segments. For example, some conventional offload engines may merely drop out-of-order TCP segments. Dropped TCP segments need to be retransmitted by the sender, thereby utilizing additional bandwidth and reducing effective throughput. On links with large bandwidth-delay products such as high-speed local area network (LAN) of the order of 1 Gbps or faster, a large number of segments may be in transit between the sender and the receiver when the out-of-order TCP segment is dropped. Accordingly, many of the segments in transit must be retransmitted, thereby creating a substantial delay and excessive consumption of additional, often expensive and scarce bandwidth. TCP may also cut back on bandwidth allowed for a connection as the retransmission may be interpreted as being the result of congestion. This may further cause congestion avoidance mechanism to commence operation. A similar or even worse situation may arise with, for example, metropolitan area networks (MANs) with high bandwidth and moderate latencies or with long-haul wide area networks (WANs) that may have moderate bit rates and typical delays of the order of about 100 ms. In these types of networks, for example, system performance and throughput may be drastically reduced by the retransmissions.

In some conventional systems, on the sender or transmitter side, TCPs generally begin transmission by injecting multiple TCP segments into the network corresponding to a maximum window size that may be indicated by a receiver. In networks in which traffic traverses multiple networking entities or devices having varying link speeds, some of the networking entities or devices may have to queue TCP segments in order to handle the traffic. For example, network devices such as routers especially interfacing faster links with slower links in the communication path between the transmitter side and the receiver side may have to queue TCP segments. In this regard, there may be instances when there is insufficient memory on the networking entities or devices for queuing the TCP segments resulting in dropped segments. Accordingly, the TCP segments will have to be retransmitted, thereby consuming additional bandwidth.

In certain systems, retransmission may trigger TCP slow start and congestion-avoidance procedures which may result in substantial decrease in available bandwidth of a communication link. TCP slow start is an algorithm that may be utilized to minimize the effects of lost packets that may result from insufficient memory on slower networking entities or devices. TCP slow start utilizes a congestion window that is initialized to one TCP segment at the time of link initiation. In operation, the number of TCP segment allowed to be transmitted before and acknowledgment is received is incremented by one (1) for every acknowledgement (ACK) received from the remote peer. The sending side may therefore transmit a minimum number of TCP segments as specified by the minimum of the congestion window and the window that may be advertised by the receiving side. This may provide a near exponential growth in the window side and at some point, maximum capacity may be reached and the networking entity or device may start dropping packets.

Congestion avoidance is an algorithm that may be utilized in conjunction with slow start to minimize the effects of lost packets. Congestion may occur when a device may receive more TCP segments at its input than it may be able to adequately process or more then it can send on the egress. Congestion may also occur when TCP segments transition from a faster transport infrastructure to a slower transport infrastructure. In this regard, the network device at the edge of the faster transport infrastructure and the slower transport infrastructure becomes a bottleneck. Congestion avoidance utilizes packet loss and duplicate acknowledgements (ACKs) to determine when congestion occurs. As a result, the sender rate may be cut by half every time congestion is experienced.

Although slow start and congestion avoidance have varying objectives and are independent of each other, TCP recovery from congestion may involve decreasing the transmission rate and executing slow start to gradually increase the transmission rate from a window size of one (1). In some cases, TCP on the remote peer generates numerous ACKs and the local peer's congestion avoidance may interpret this to mean that TCP segments are lost, resulting in retransmission. Accordingly, TCP recovery from congestion avoidance and/or TCP slow start can be a relatively slow process especially for high bandwidth and may in certain instances, also cause unwanted retransmissions.

Other conventional offload engines may store out-of-order TCP segments in dedicated buffers attached to the offload engines residing on the NIC or a host memory until all the missing TCP segments have been received. The offload engine may then reorder and process the TCP segments. However, storing the TCP segments in dedicated buffers can be quite hardware intensive. For example, the size of the dedicated buffers scale with the product of the bandwidth of the connections times the delay on the connections, and with the number of connections. In addition, storing the out-of-order segments on dedicated buffers may consume precious processor bandwidth when the out-of-order segments have to be reordered and processed. In addition, the offload engine still needs to handle other segments arriving at wire speed. Therefore, the reordering and processing may have to occur at the expense of delaying the processing of currently received TCP segments or by over provisioning of processing power that is scarce and hard to acquire for high speed of networks.

Accordingly, the computational power of the offload engine needs to be very high or at least the system needs a very large buffer to compensate for any additional delays due to the delayed processing of the out-of-order segments. When host memory is used for temporary storage of out-of-order segments, additional system memory bandwidth may be consumed when the previously out-of-order segments are copied to respective buffers. This choice complicates the processing of the data as the offload engine needs to communicate the state variables to a software agent for processing. While the software processes the state variables, the offload engine can't process new frames received for that TCP flow and has to buffer them. When the software agent is done, it needs to move the state variables back to the offload engine. If on the other hand, the offload engine tries to process the data stored on the host memory instead of the software agent, it encounters longer latencies than when processing frames locally, making this option very low performance or almost impractical.

Another design approach to a TCP offload Engine may be a flow-through approach. In the flow-through approach, the engine processes every TCP segment upon reception with no buffering, except for speed matching. The advantages of such a design approach are evidently the lack of external data buffering which scales with bandwidth delay product and with the number of connections. It adds cost, real estate and power to the solution as well additional pins on the offload engine ASIC to connect to the memory over a high speed bus. It also saves the additional complexity for reordering the out-of-order segments and processing them while additional traffic is received.

However, one challenge generally faced by TCP implementers wishing to design a flow-through NIC, is that TCP segments may arrive out-of-order with respect to the order in which they were transmitted. This may prevent or otherwise hinder the immediate processing of TCP control data and prevent the placing of the data in a host buffer. Accordingly, an implementer may be faced with the option of dropping out-of-order TCP segments or storing the TCP segments locally on the NIC until all the missing segments have been received. Once all the TCP segments have been received, they may be reordered and processed accordingly. In instances where the TCP segments are dropped or otherwise discarded, the sending side may have to re-transmit all the dropped TCP segments and in some instances, may result in about a fifty percent (50%) or greater decrease in throughput or bandwidth utilization, as described above.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Some aspects of the present invention may be found in, for example, systems and methods that handle out-of-order frames. In one embodiment, the present invention may provide a method that handles out-of-order frames. The method may include, for example, one or more of the following: receiving an out-of-order frame via a network subsystem; placing data of the out-of-order frame in a host memory; and managing information relating to one or more holes in a receive window. In a further embodiment, the network subsystem may include, for example, a network controller or an offload engine. Moreover, the data of the out-of-order frame may be placed in a temporary buffer, an upper layer protocol (ULP) buffer or an application buffer residing in the host memory.

In another embodiment, the present invention may provide a method that handles out-of-order frames. The method may include, for example, one or more of the following: parsing an out-of-order frame into control information and data information; processing at least one of the control information, the data information and context information to determine a buffer location in a host memory in which to place the data information; and managing receive window hole information. In a further embodiment, the receive window hole information may be, for example, TCP receive window hole information.

In yet another embodiment, the present invention may provide a system that handles out-of-order frames. The system may include, for example, a host and a network subsystem. The host may include, for example, a host memory. The network subsystem may be coupled to the host. The network subsystem may process an out-of-order frame, place data of the out-of-order frame in the host memory, and manage information relating to one or more holes in a receive window. In a further embodiment, the network subsystem may include, for example, a network controller or an offload engine on a network interface card (NIC). In another further embodiment, the network subsystem may include, for example, a network controller or an offload engine that is embedded on a motherboard or integrated into a main chipset.

These and other advantages, aspects and novel features of the present invention, as well as details of a illustrated embodiment thereof, will be more fully understood from the following description and drawings.

DETAILED DESCRIPTION OF THE INVENTION

Figure 1A:
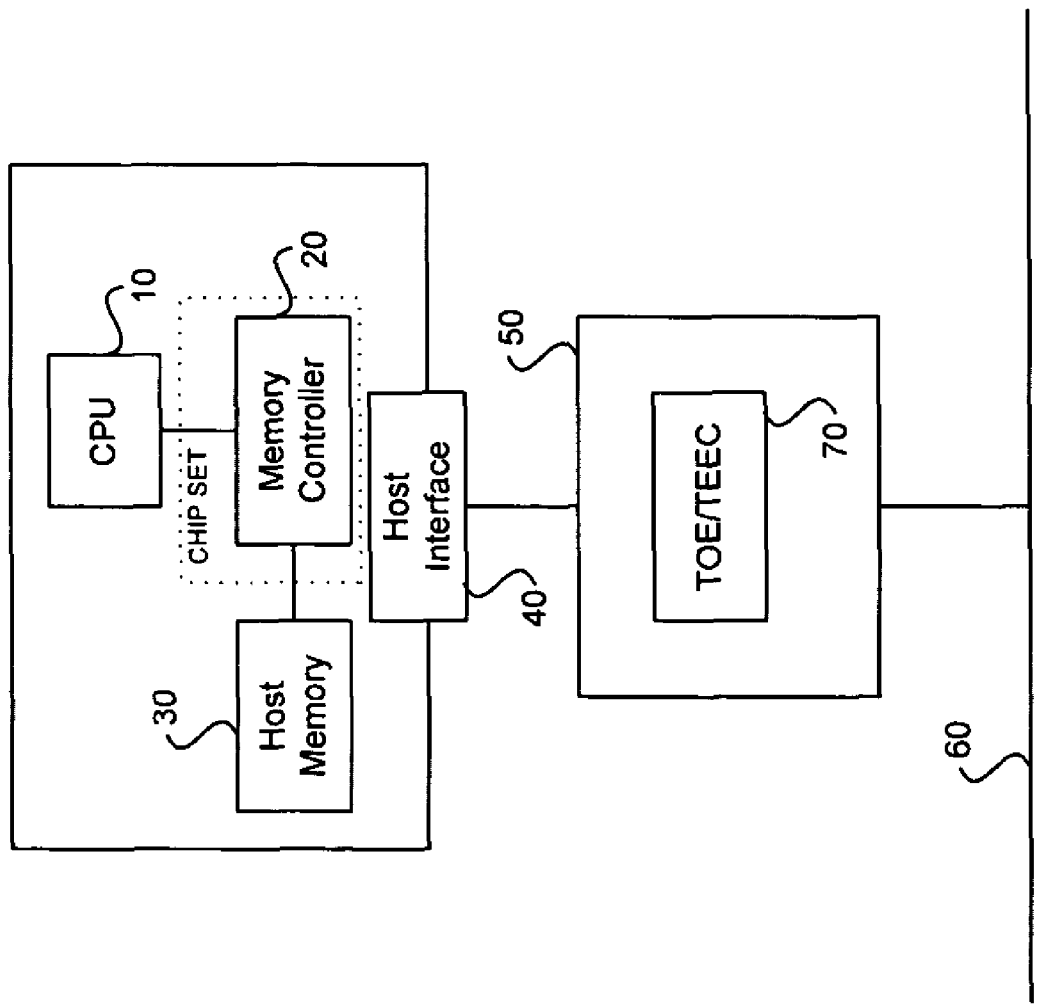
FIG. 1A is a block diagram of an exemplary system that may be utilized in connection with handling out-of-order frames in accordance with an embodiment of the invention.

FIG. 1A is a block diagram of an exemplary system that may be utilized in connection with handling out-of-order frames in accordance with an embodiment of the invention. Accordingly, the system of FIG. 1A may be adapted to handle out-of-order (OOO) transmission control protocol (TCP) datagrams in a flow-through manner according to aspects of the invention. Referring to FIG. 1A, the system may include, for example, a CPU 10, a memory controller 20, a host memory 30, a host interface 40, network subsystem 50 and an Ethernet 60. The network subsystem 50 may include, for example, a TCP-enabled Ethernet Controller (TEEC) or a TCP offload engine (TOE) 70. The network subsystem 50 may include, for example, a network interface card (NIC). The host interface 40 may be, for example, a peripheral component interconnect (PCI) or another type of bus. The memory controller 30 may be coupled to the CPU 20, to the memory 30 and to the host interface 40. The host interface 40 may be coupled to the network subsystem 50 via the TEEC or the TOE 70.

Figure 1B:
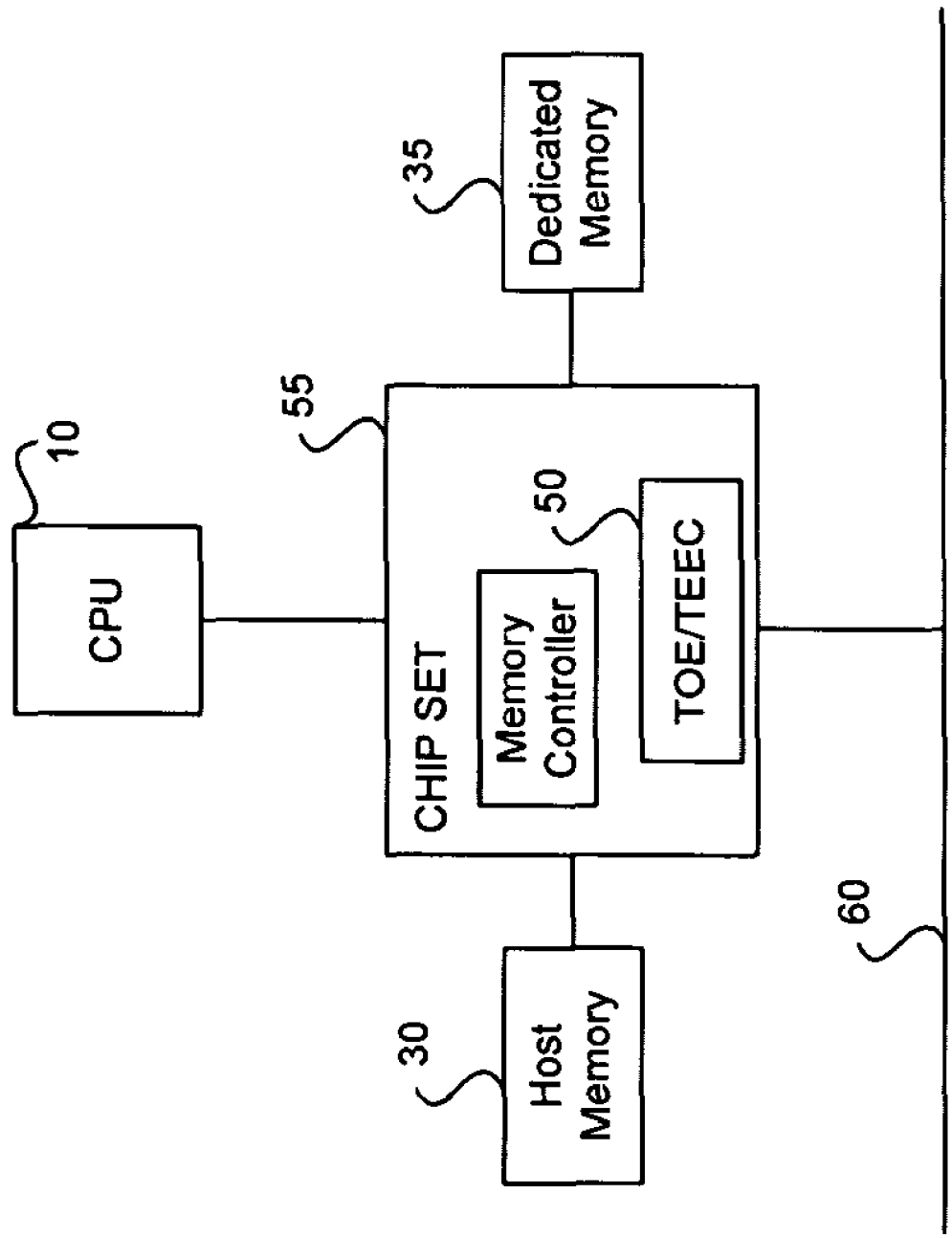
FIG. 1B is a block diagram of another exemplary system that may be utilized in connection with handling out-of-order frames in accordance with an embodiment of the invention.

FIG. 1B is a block diagram of another exemplary system that may be utilized in connection with handling out-of-order frames in accordance with an embodiment of the invention. Accordingly, the system of FIG. 1B may be adapted to handle out-of-order (OOO) transmission control protocol (TCP) datagrams in a flow-through manner according to aspects of the invention. Referring to FIG. 1B, the system may include, for example, the CPU 10, the host memory 30, a dedicated memory 35 and a chip set 55. The chip set 55 may include, for example, the network subsystem 50. The chip set 55 may be coupled to the CPU 10, to the host memory 30, to the dedicated memory 35 and to the Ethernet 60. The network subsystem 50 of the chip set 55 may be coupled to the Ethernet 60. The network subsystem 50 may include, for example, the TEEC or the TOE which may be coupled to the Ethernet 60. The dedicated memory 35 may provide buffers for context or data.

Although illustrated, for example, as a CPU and an Ethernet, the present invention need not be so limited to such exemplary examples and may employ, for example, any type of processor and any type of data link layer or physical media, respectively. Accordingly, although illustrated as coupled to the Ethernet 60, the TEEC or the TOE 70 may be adapted for any type of data link layer or physical media. Furthermore, the present invention also contemplates different degrees of integration and separation between the components illustrated in FIGS. 1A-B. For example, the TEEC or the TOE 70 may be a separate integrated chip from the chip set 55 embedded on a motherboard or may be embedded in a NIC. In addition, the dedicated memory 35 may be integrated with the chip set 55 or may be integrated with the network subsystem 50.

Some embodiments of the TEEC 70 are described in, for example, U.S. patent application Ser. No. 10/652,267 (now U.S. Pat. No. 7,346,701), entitled "System and Method for TCP Offload" filed on Aug. 29, 2003. The above-referenced United States patent application is hereby incorporated herein by reference in its entirety.

Some embodiments of the TOE 70 are described in, for example, U.S. Provisional Patent Application Ser. No. 60/408,207, entitled "System and Method for Fault Tolerant TCP Offload" and filed on Sep. 4, 2002; U.S. patent application Ser. No. 10/337,029, entitled "System and Method for Fault Tolerant TCP Offload" and filed on Jan. 6, 2003; U.S. Provisional Patent Application Ser. No. 60/411,294, entitled "System and Method for Handling Partially Processed Frames" and filed on Sep. 17, 2002; U.S. patent application Ser. No. 10/302,474, entitled "System and Method for Handling Frames in Multiple Stack Environment" and filed on Nov. 21, 2002; U.S. Provisional Patent Application Ser. No. 60/410,022, entitled "System and Method for TCP Offloading and Uploading" and filed on Sep. 11, 2002; U.S. patent application Ser. No. 10/298,817, entitled "System and Method for TCP Offloading and Uploading" and filed on Nov. 18, 2002; U.S. Provisional Patent Application Ser. No. 60/408,617, entitled "System and Method for TCP/IP Offload" and filed on Sep. 6, 2002; and U.S. patent application Ser. No. 10/652,267 (now U.S. Pat. No. 7,346,701) entitled "System and Method for TCP Offload" and filed on Aug. 29, 2003. The above-referenced United States patent applications are all hereby incorporated herein by reference in their entirety.

Figure 1C:
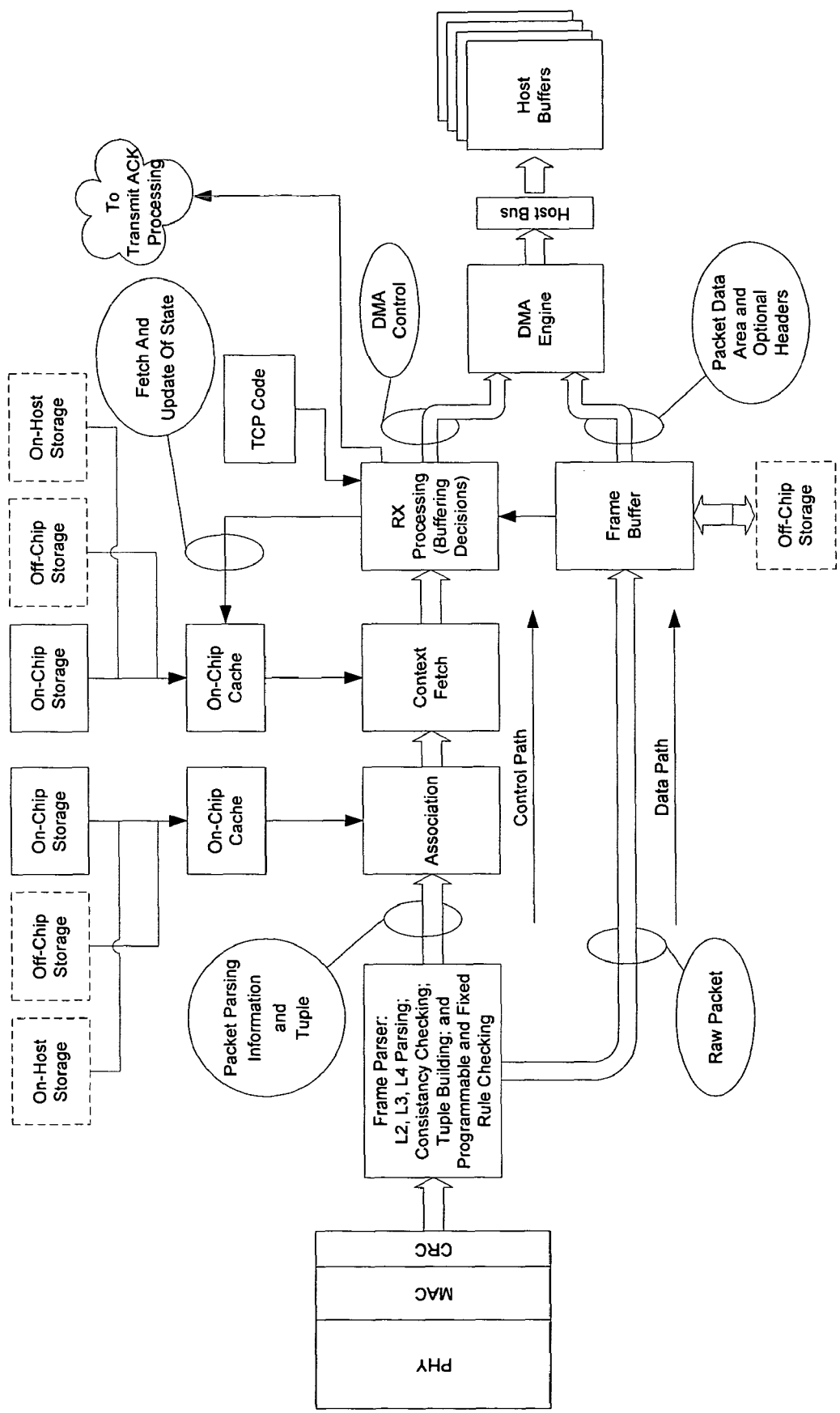
FIG. 1C is a block diagram of a system for handling out-of-order (OOO) transmission control protocol (TCP) datagrams in a flow-through manner in accordance with an embodiment of the invention.

FIG. 1C is a block diagram of a system for handling out-of-order (OOO) transmission control protocol (TCP) datagrams in a flow-through manner in accordance with an embodiment of the invention. Referring to FIG. 1C, the incoming frame may be subject to L2 such as Ethernet processing including, for example, address filtering, frame validity and error detection. Unlike an ordinary Ethernet controller, the next stage of processing may include, for example, L3 such as IP processing and L4 such as TCP processing. The TEEC may reduce the host CPU utilization and memory bandwidth, for example, by processing traffic on hardware offloaded TCP/IP connections. The TEEC may detect, for example, the protocol to which incoming packets belong. If the protocol is TCP, then the TEEC may detect if the packet corresponds to an offloaded TCP connection, for example, a connection for which at least some TCP state information may be kept by the TEEC.

Once a connection has been associated with a packet or frame, any higher level of processing such as L5 or above may be achieved. If the packet corresponds to an offloaded connection, then the TEEC may direct data movement of the data payload portion(s) of the frame. The destination of the payload data may be determined from the connection state information in combination with direction information within the frame. The destination may be a host memory, for example. Finally, the TEEC may update its internal TCP and higher levels of connection state and may obtain the host buffer address and length from its internal connection state.

The receive system architecture may include, for example, a control path processing and data movement engine. The system components above the control path as illustrated in upper portion of FIG. 1C, may be designed to deal with the various processing stages used to complete, for example, the L3/L4 or higher processing with maximal flexibility and efficiency and targeting wire speed. The result of the stages of processing may include, for example, one or more packet identification cards (PID_Cs) that may provide a control structure that may carry information associated with the frame payload data. This may have been generated inside the TEEC while processing the packet in the various blocks. A data movement system as illustrated in the lower portion of FIG. 1C, may move the payload data portions of a frame along from, for example, an on-chip packet buffer and upon control processing completion, to a direct memory access (DMA) engine and subsequently to the host buffer that was chosen via processing.

The receiving system may perform, for example, one or more of the following: parsing the TCP/IP headers; associating the frame with an end-to-end TCP/IP connection; fetching the TCP connection context; processing the TCP/IP headers; determining header/data boundaries; mapping the data to a host buffer(s); and transferring the data via a DMA engine into these buffer(s). The headers may be consumed on chip or transferred to the host via the DMA engine.

The packet buffer may be an optional block in the receive system architecture of FIG. 1C. It may be utilized for the same purpose as, for example, a first-in-first-out (FIFO) data structure is utilized in a conventional L2 NIC or for storing higher layer traffic for additional processing.

The packet buffer in the receive system of FIG. 1C may not be limited to a single instance. As control path processing is performed, the data path may store the data between data processing stages one or more times depending, for example, on protocol requirements.

Figure 1D:
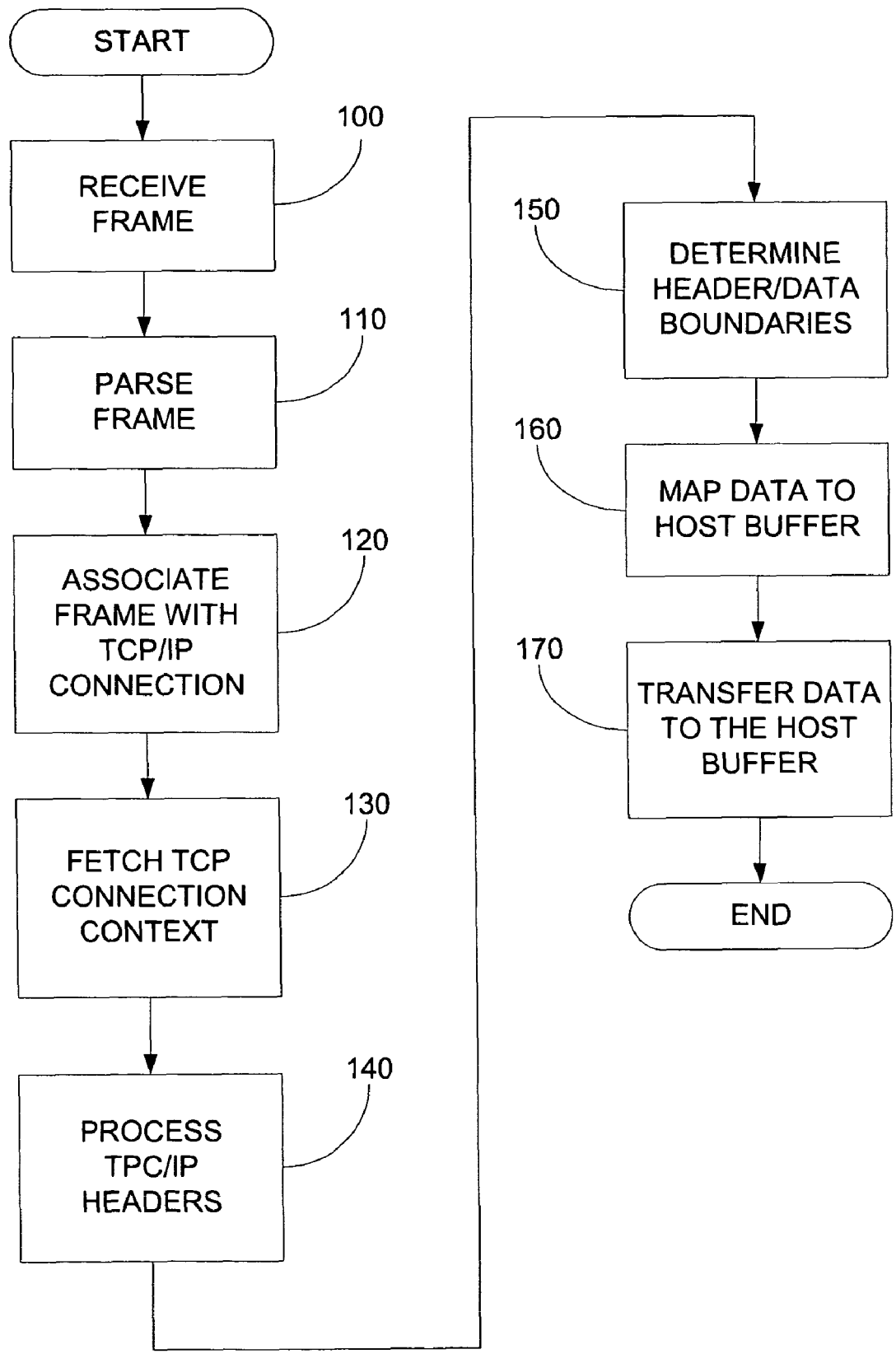
FIG. 1D is a flowchart illustrating exemplary steps for frame reception in accordance with an embodiment of the invention.

FIG. 1D is a flowchart illustrating exemplary steps for frame reception in accordance with an embodiment of the invention. Referring to FIG. 1C and FIG. 1D, in step 100, the NIC 50 may receive a frame from, for example, the Ethernet 60. In step 110, the frame parser may parse the frame, for example, to find the L3 and L4 headers. The frame parser may process the L2 headers leading up to the L3 header, for example IP version 4 (IPv4) header or IP version 6 (IPv6) header. The IP header version field may determine whether the frame carries an IPv4 datagram or an IPv6 datagram.

For example, if the IP header version field carries a value of 4, then the frame may carry an IPv4 datagram. If, for example, the IP header version field carries a value of 6, then the frame may carry an IPv6 datagram. The IP header fields may be extracted, thereby obtaining, for example, the IP source (IP SRC) address, the IP destination (IP DST) address, and the IPv4 header "Protocol" field or the IPv6 "Next Header". If the IPv4 "Protocol" header field or the IPv6 "Next Header" header field carries a value of 6, then the following header may be a TCP header. The results of the parsing are added to the PID_C and the PID_C travels with the packet inside the TEEC.

The rest of the IP processing may subsequently take place later in a manner similar to the processing in a conventional off-the-shelf software stack. Implementation may vary from the use of firmware on an embedded processor to a dedicated, finite state machine, which may be potentially faster, or a hybrid of a processor and a state machine. The implementation may vary with, for example, multiple stages of processing by one or more processors, state machines, or hybrids. The IP processing may include, for example, extracting information relating to, for example, length, validity, fragmentation, etc. The located TCP header may also be parsed and processed. The parsing of the TCP header may extract information relating to, for example, the source port and the destination port.

The TCP processing may be divided into a plurality of additional processing stages. In step 120, the frame may be associated with an end-to-end TCP/IP connection. After L2 processing, in one embodiment, the present invention may provides that the TCP checksum be verified. The end-to-end connection may be uniquely defined by, for example, the following 5 tuple: IP Source address (IP SRC addr); IP destination address (IP DST addr); L4 protocol above the IP protocol such as TCP, UDP or other upper layer protocol; TCP source port number (TCP SRC); and TCP destination port number (TCP DST). The process may be applicable for IPv4 or IPv6 with the choice of the relevant IP address.

As a result of the frame parsing in step 110, the 5 tuple may be completely extracted and may be available inside the PID_C. Association hardware may compare the received 5 tuple with a list of 5 tuples stored in the TEEC. The TEEC may maintain a list of tuples representing, for example, previously handled off-loaded connections or off-loaded connections being managed by the TEEC. The memory resources used for storing the association information may be costly for on-chip and off-chip options. Therefore, it is possible that not all of the association information may be housed on chip. A cache may be used to store the most active connections on chip. If a match is found, then the TEEC may be managing the particular TCP/IP connection with the matching 5 tuple.

Figure 1E:
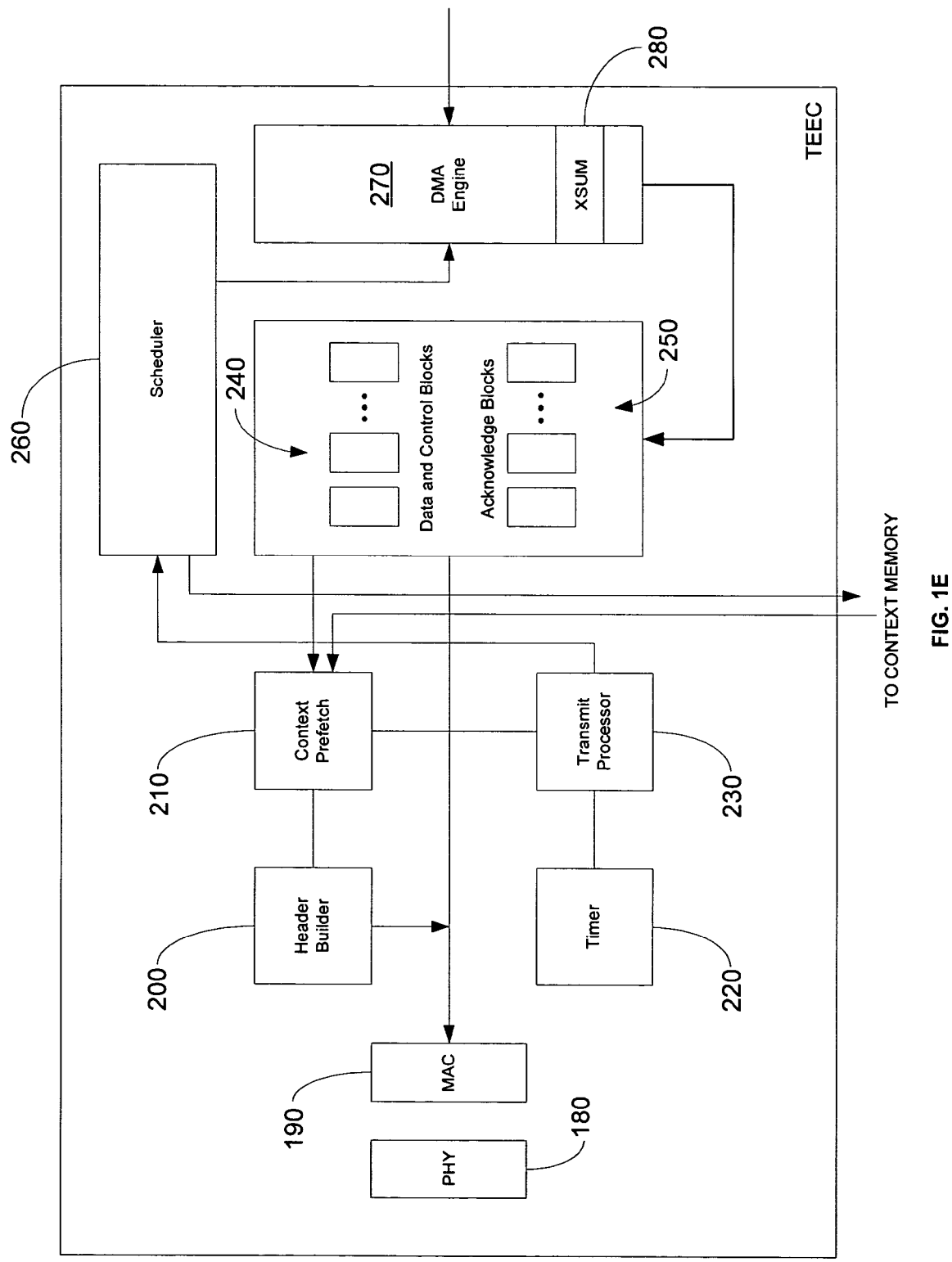
FIG. 1E illustrates an exemplary transmission path in accordance with an embodiment of the invention.

FIG. 1E illustrates an exemplary transmission path in accordance with an embodiment of the invention. Referring to FIG. 1E, the TEEC may include, for example, a physical layer (PHY) 180, a MAC layer 190, a header builder 200, a context prefetch 210, a timer 220, a transmit processor, with for example, transmit code 230, data and control blocks 240, acknowledge blocks 250, a scheduler 260 and a DMA engine 270. The timer 220 may include, for example, retransmit timers. The scheduler 260 may be adapted for functions, including but not limited to, allocating bandwidth to connections that have data to be transmitted, based on remote availability of TCP buffers determined by TCP window and/or retransmit arbitration. The DMA engine 270 may include, for example, an XSUM block 280 or other data specific processing. This may include insertion of data into the data provided by the host and computing CRC values. The data processing is not limited to these functions.

On the transmission path, the support for L4 and higher levels may include additional complexity and functionality. Transmission may include performing, for example, one or more of the following: scheduling transmission flow; transferring data via DMA; fetching context; transmit processing; adding L5 or higher and TCP/IP headers; arming the timers; and L2 transmitting.

The scheduler 260 may decide which flow to serve next. The scheduler 260 may also handle multiplexing L2 and L4 and higher levels of traffic. With respect to L4 and higher levels of traffic, the decision to schedule a particular TCP/IP flow for transmission may depend upon, for example, one or more of the following factors: data availability for transmission on the host side; remote end buffering state such as when a remote TCP connection has not closed the TCP window; preventing starvation among the potentially large number of TCP connections competing for time on the Ethernet media; availability of TCP acknowledges from the receive side; and a need to retransmit information on behalf of a TCP connection.

Utilizing some or all of the above-identified information or other information, the scheduler 260 may pick the next flow to be transmitted. The scheduler 260 may fetch the pointer to the next host resident buffer from the context information. The scheduler 260 may also program the DMA engine 270 to get the data and store the data, for example, in the on-chip FIFO buffer.

The DMA engine 270 may transfer the data from the host buffer or buffers into, for example, an on-chip, transmit-side FIFO buffer. IP Checksum (IPv4) and TCP Checksum may be computed on the data being transferred. The computations may be performed concurrently with data movement. Higher levels of data processing may be done at this stage.

Flow context may be fetched, for example, by the context prefetch 220 from a central context resource. Accessing the central context resource may increase the usefulness of a locking mechanism among all of its consumers to ensure data integrity and coherency. The locking mechanism may be very efficient in minimizing undesired performance impact. The context for the selected flow may be provided to the transmit processor 230 such as a CPU and/or finite state machine (FSM).

The transmit processor 230 or finite state machine or a combination thereof, may be adapted, for example, to execute TCP/IP and higher levels of code, to update the context and to generate the TCP/IP and higher level header variables to be placed in the headers. The updated context may be stored. The processing for this stage may be performed by one or more stages including one or more processors, state machines or hybrid processors.

The header builder 200 may use the header variables generated by transmit processor 230 and may generate the TCP/IP and higher level headers and may attach the TCP/IP and higher level headers in front of the data to be transmitted. Using the partial checksum results obtained from the DMA engine 270, the header builder 200 may finalize the checksum fields and may place them in the respective headers. Transmit processing is not limited to a specific number of stages and processing and may be executed at different stages of processing as may be optimal.

The timer 220 may be armed by the transmit processor 230 and may update its future timer event list. When the L4 and higher levels of processing are complete, the L2 processing and transmission may follow the conventional steps performed by a conventional Ethernet controller.

A retransmission event is similar to a normal transmission except, for example, the data to be retransmitted may be fetched from the host buffers as before or from any other temporary holding buffers. The address for this data may be computed. The computation of the host buffer address may be more complex. The same mapping function described in the receive path section may be utilized for the retransmission TCP sequence number range. Once the buffer address is determined, the rest of the transmit process may occur as described above.

Exemplary receive and transmit paths a TEEC in accordance with an embodiment of the invention are described in U.S. patent application Ser. No. 10/652,267 (now U.S. Pat. No. 7,346,701) filed Aug. 29, 2003 and is incorporated herein by reference in its entirety.

Hereinafter, although reference shall be made with respect to the TEEC 70, the present invention also contemplates using a TOE 70 instead of or in combination with the TEEC 70. Accordingly, descriptions relating to the TEEC 70 may also be applied with respect to the TOE 70. The TEEC is an engine that performs, among other things, TCP/IP processing in a flow through manner.

In operation, on the receive path, a frame may be received by the network subsystem 50 from the Ethernet 60 in accordance with an embodiment of the present invention. The network subsystem 50 may include, for example, a NIC. The TEEC 70, for example, may parse and may process the headers of the received frame. The control information may be parsed from the data information of the received frame. Parsing may include, for example, one or more of the following: finding boundaries of fields with control information, check-ing for correctness and separating control information from data information. The TEEC 70 may process at least one of the control information, the data information and context information (e.g., state information about the connection with which the out-of-order frame may be associated) in determining, for example, whether the received frame is a valid frame. In one embodiment, a valid frame may be defined as a frame within the TCP window (e.g., a receive window). In another embodiment, an invalid frame may be defined as a frame not within the TCP window or as a duplicate frame in the TCP window. If the frame is not valid, then the frame may be dropped. If the frame is valid, then the TEEC 70 may process at least one of, for example, the control information, the data information and the context information to place the data information into, for example, a particular temporary buffer, an upper layer protocol (ULP) buffer or an application buffer in the memory 30 of the host via the host interface 40 and the memory controller 20. In one embodiment, if only a portion of the frame is valid, then only the valid portion of the data information of the frame may be placed into the host memory 30.

The placement of data information may be performed, for example, by mapping the TCP space into the buffer space. The buffer space may be represented as, for example, a linear space. The first byte of the buffer may correspond to a particular TCP sequence value. Other bytes in the TCP segment may be placed via offsets in the buffer that may correspond to respective deltas in the TCP sequence space with respect to the sequence value of the first byte. Some embodiments may provide for a ULP-specific translation that maps particular ranges of the TCP sequence numbers to particular buffer areas.

In one embodiment, the TEEC 70 may associate the incoming frame with, for example, an established connection that is being managed by the TEEC 70. The placement of the data information of the frame in the TCP window, for example, may create or may modify one or more holes in the TCP window. Information about any of the existing holes in the TCP window may be stored and managed (e.g., generated, updated, copied, deleted, etc.) in the TEEC 70 or stored in a memory (e.g., a dedicated memory) that may be on the network subsystem 50 (e.g., on a NIC), off the network subsystem 50 (e.g., off a NIC), on the chip set 55, off the chip set 55, embedded on a motherboard or some combination thereof.

Some embodiments of the present invention may provide for a selectable (e.g., programmable) limit on the number of holes that the TEEC 70 may manage within the TCP window. The selectable limit may represent, for example, an optimal number of holes that a flow-through network subsystem 50 (e.g., a flow-through NIC of the network subsystem 50) may support. The optimal number of holes may depend upon, for example, the type of connection. For example, a wide area network (WAN) connection may drop frames mainly due to router congestion yielding potentially many holes in a large window. In another example, a local area network (LAN) connection may have a single drop due to a switch drop before a link-by-link flow control is triggered thereby preventing more traffic from flowing.

Some embodiments of the present invention may provide that the network subsystem 50 support a ULP on top of TCP. The control information and the data information may be separated from incoming frames with the data information being placed in the host memory 30 and possibly buffering some control information on the network subsystem 50. In some cases, more state information may have to be maintained or managed per hole. Furthermore, ULP-specific activities may be employed once a hole is plugged or once the receiver receives more information about the behavior expected by the ULP in the control plane (e.g., to notify the ULP of a completion of a message).

Figure 2A:
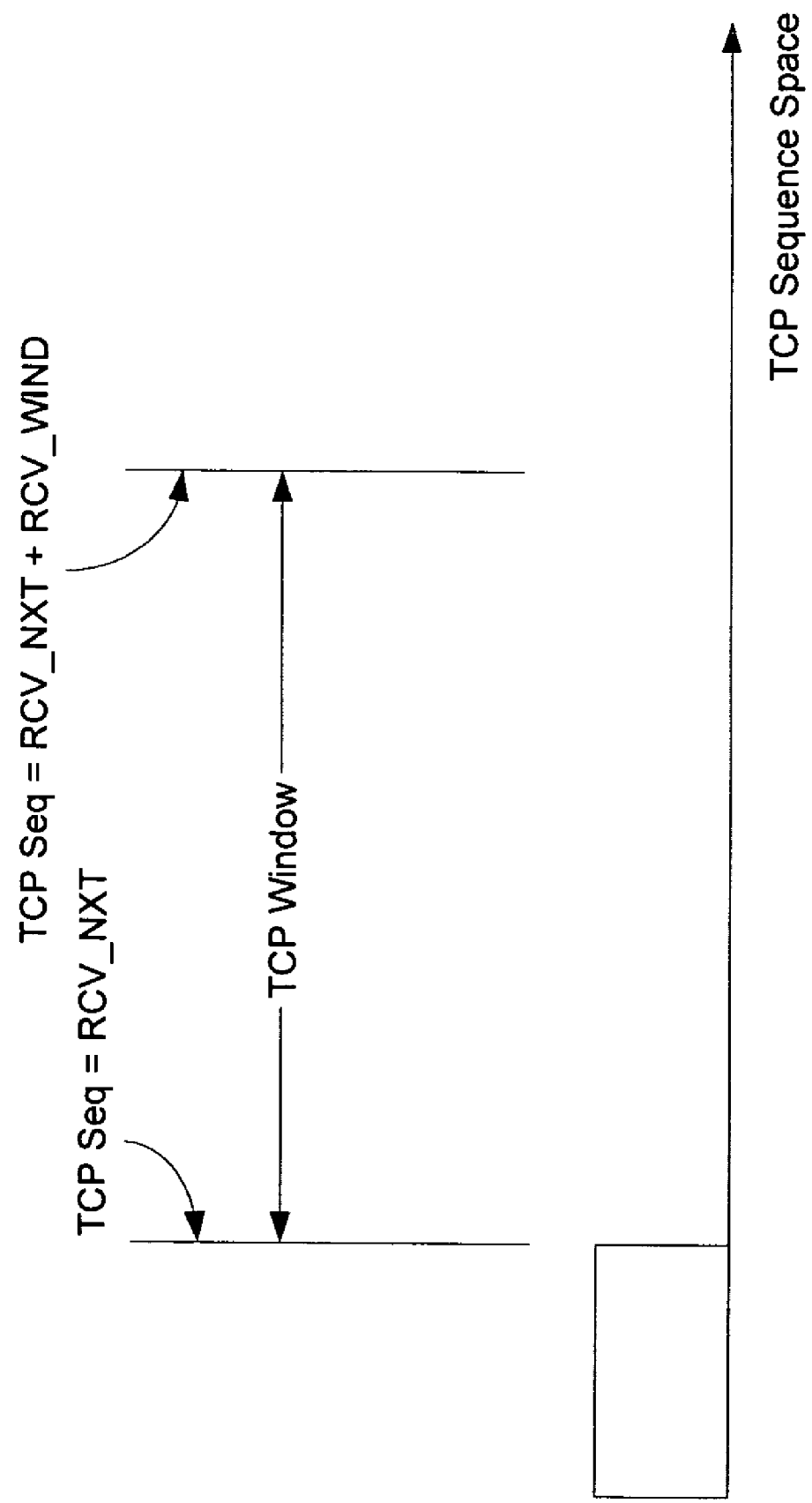
FIGS. 2A-C is a block diagram illustrating various out-of-order data inside a TCP receive window in connection with the handling out-of-order frames in accordance with an embodiment of the invention.
Figure 2B:
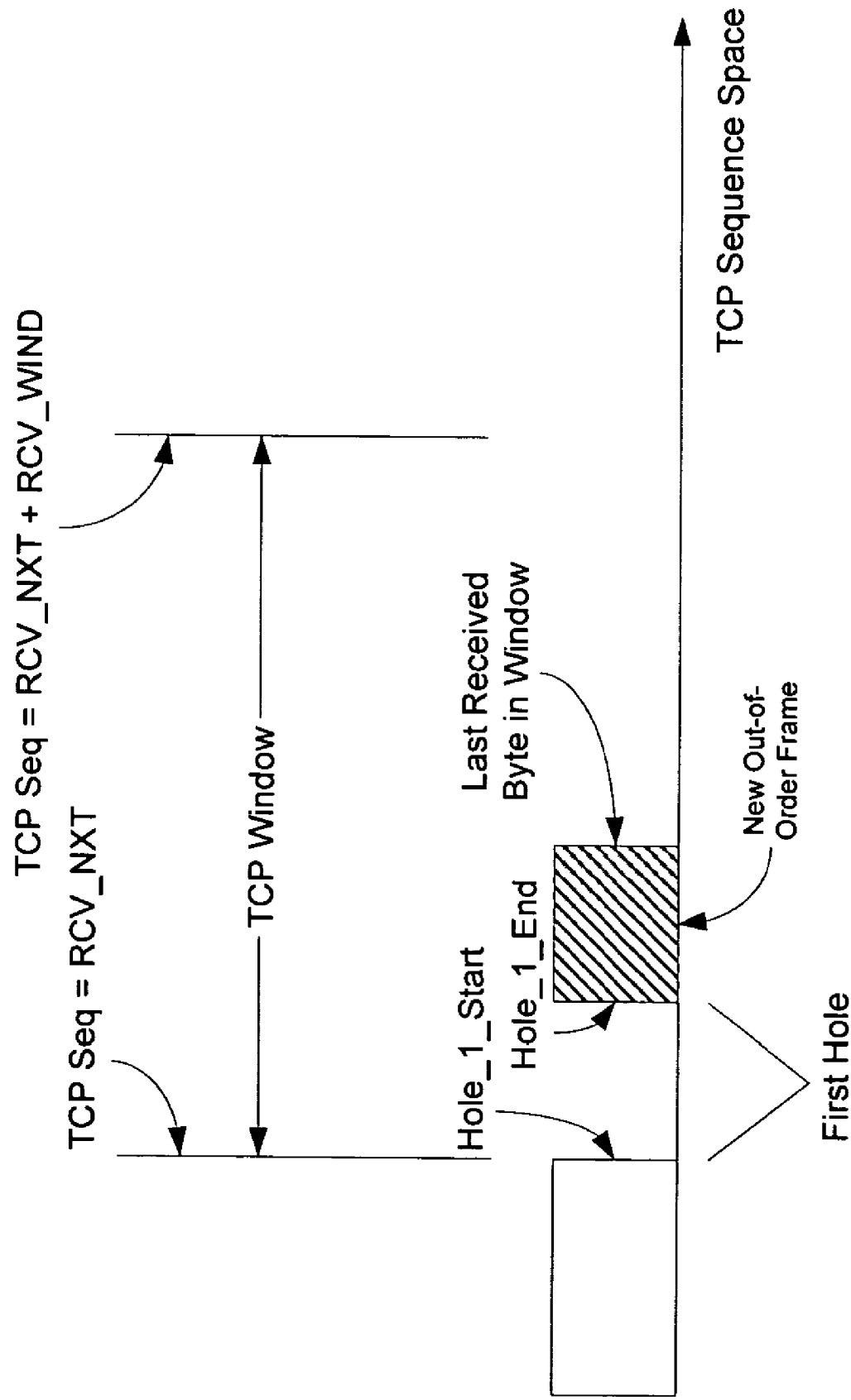
Figure 2C:
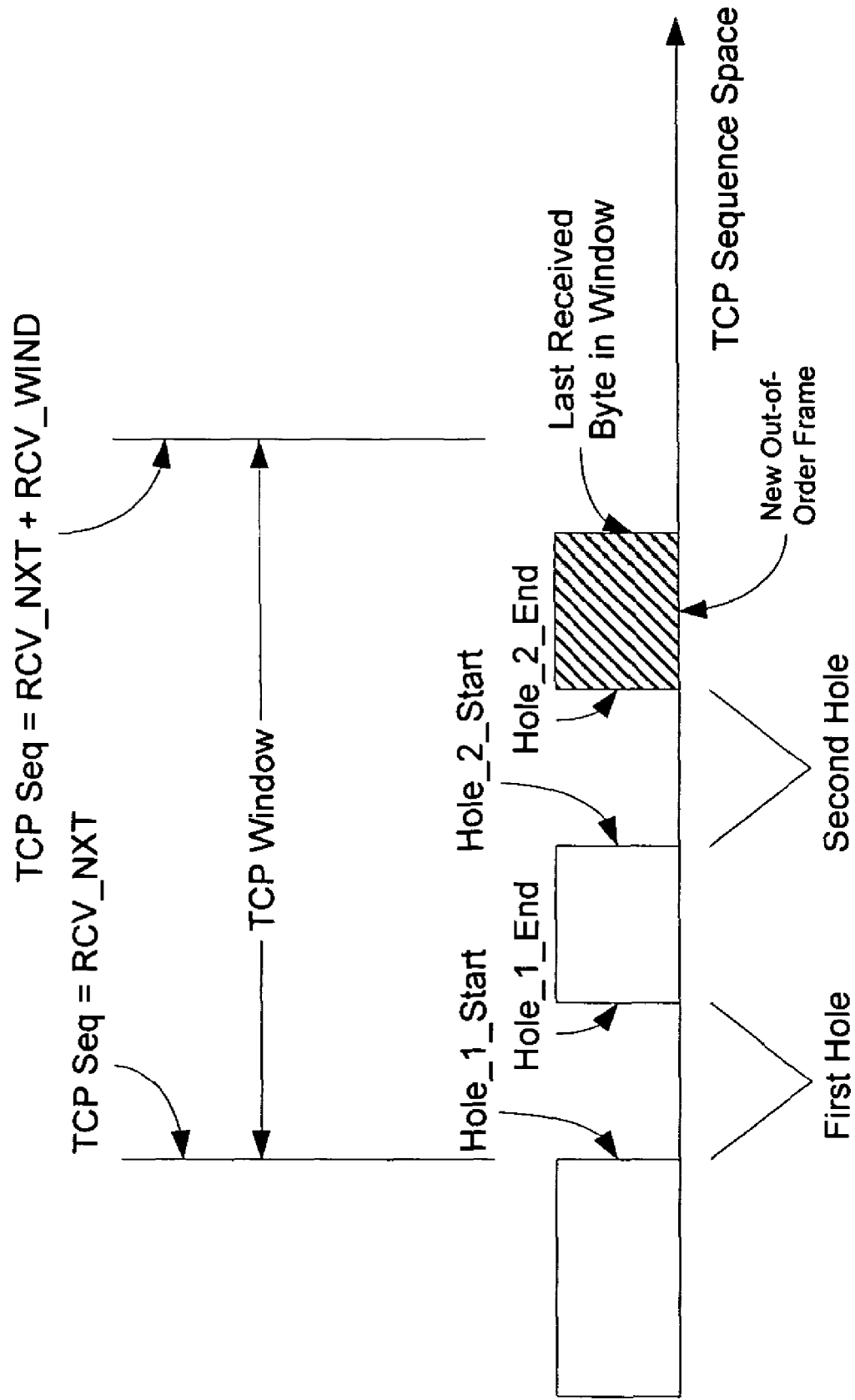

FIGS. 2A-C is a block diagram illustrating various out-of-order data inside a TCP receive window in connection with the handling out-of-order frames in accordance with an embodiment of the invention. In FIG. 2A, a TCP window may be defined in TCP sequence space. In one embodiment, the TCP window may have a left boundary at a TCP sequence value of RCV_NXT and a right boundary at a TCP sequence value of RCV_NXT+RCV_WIND. RCV_NXT may be a variable, for example, used to keep track of the next expected sequence number to be received by a receiver. RCV_WIND may be a variable, for example, used to determine the width of the TCP window in TCP sequence space. Although not illustrated, some embodiments of the present invention contemplate that TCP space wraps around after a particular TCP sequence number. For example, the TCP space may wrap around every $2^{32}-1$.

In FIG. 2B, an out-of-order frame may be received by the network subsystem 50. The TEEC 70 may parse and may process the out-of-order frame. In one embodiment, control information may be separated from the data information. The control information may be stored, for example, on the network subsystem 50 or, in particular, in the TEEC 70. The network subsystem 50 may include, for example, a dedicated memory on which control information related to out-of-order frames may be stored. Context information may also be stored in the dedicated memory. In one example, the dedicated memory may be off the network subsystem 50 or distributed between off-network-subsystem sites (e.g., off-NIC sites) and on-network-subsystem sites (e.g., on-NIC sites). The control information may include, for example, hole information. The TEEC 70 may process at least one of the control information, the data information and context information (e.g., state information about the connection with which the out-of-order frame may be associated) to determine a location in the host memory 30 in which to place the data information.

In one embodiment, the data information may be placed in, for example, a temporary buffer, an upper layer protocol (ULP) buffer or an application buffer residing in the host memory 30. The reception of the out-of-order data information may be referred to as a hole in the TCP window. The first hole may be defined by at least two variables: Hole_1_Start and Hole_1_End. Hole_1_Start may be defined, for example, as the TCP sequence value of the beginning of the first hole in TCP sequence space. Hole_1_End may be defined, for example, as the TCP sequence value of the ending of the first hole in TCP sequence space. The variables describing the first hole may be maintained, for example, as control information in the TEEC 70, on the network subsystem 50, off the network subsystem 50 or some combination thereof as described above. In one embodiment, although the data information of the out-of-order frame may be stored in the host memory 30 in a flow-through manner, the control information relating to the out-of-order frame may be stored on the network subsystem 50, for example, as long as the information is useful to the network subsystem 50 in processing incoming frames. The control information relating to the out-of-order frame may be stored on the network subsystem 50, for example, in a summary table or other data structure.

In FIG. 2C, a second out-of-order frame may be received by the network subsystem 50. As with the first out-of-order frame, in a flow-through process, the data information of the second out-of-order frame may be placed into the host memory 30. As illustrated in FIG. 2C, the data information of the second out-of-order frame may create a second hole. Accordingly, information about the second hole including, for example, Hole_2_Start and Hole_2_End, may be maintained as part of the control information relating to the second out-of-order frame. As with the first out-of-order frame, although the data information is placed into the host memory 30, the control information relating to the second out-of-order frame may be stored in the TEEC 70 or in a dedicated memory that may be on the network subsystem 50, off the network subsystem 50 or some combination thereof.

Figure 3A:
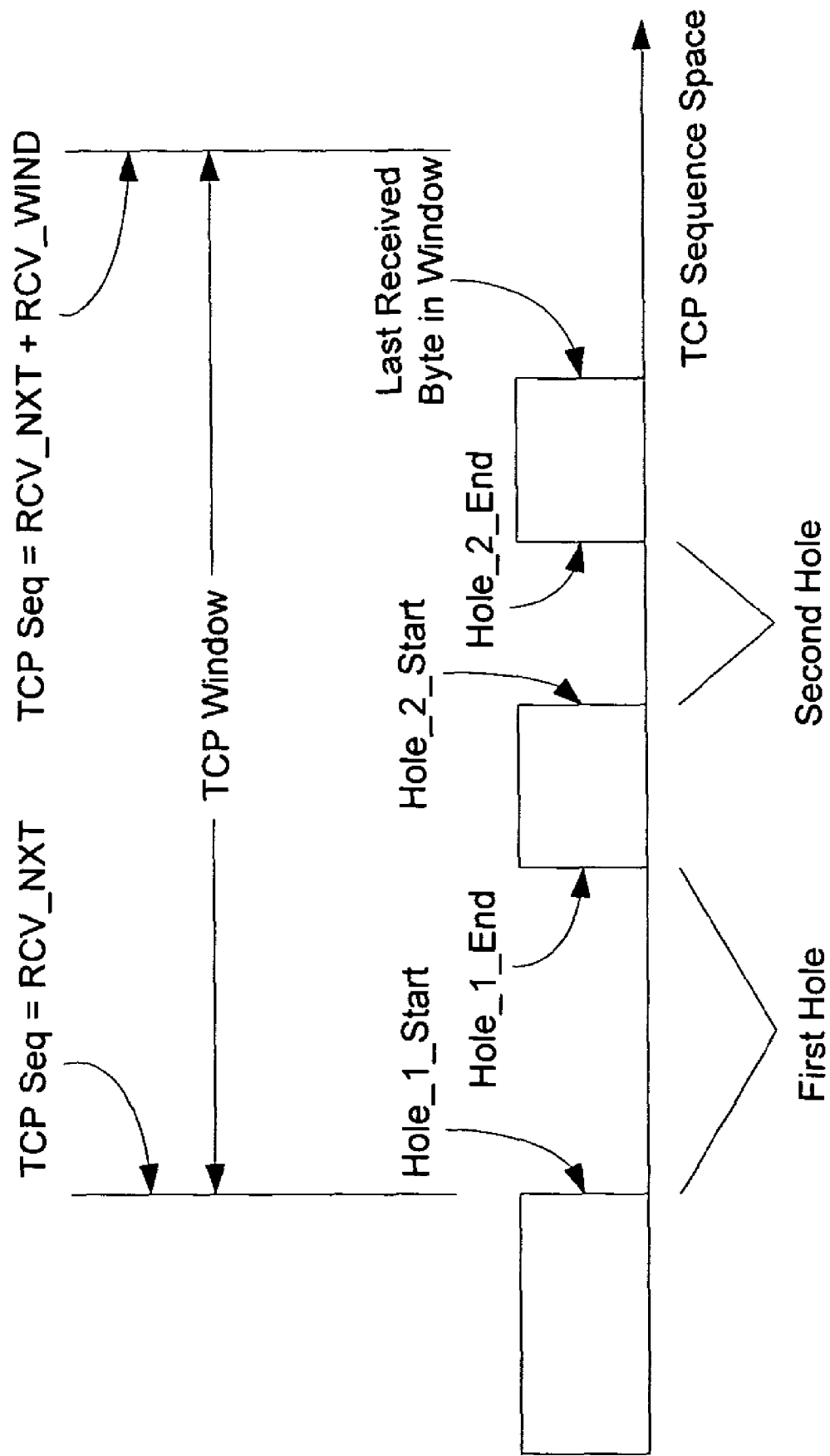
FIGS. 3A-B is a block diagram illustrating exemplary variables that may be utilized to manage various out-of-order received frame scenarios in connection with handling out-of-order frames in accordance with an embodiment of the invention.
Figure 3B:
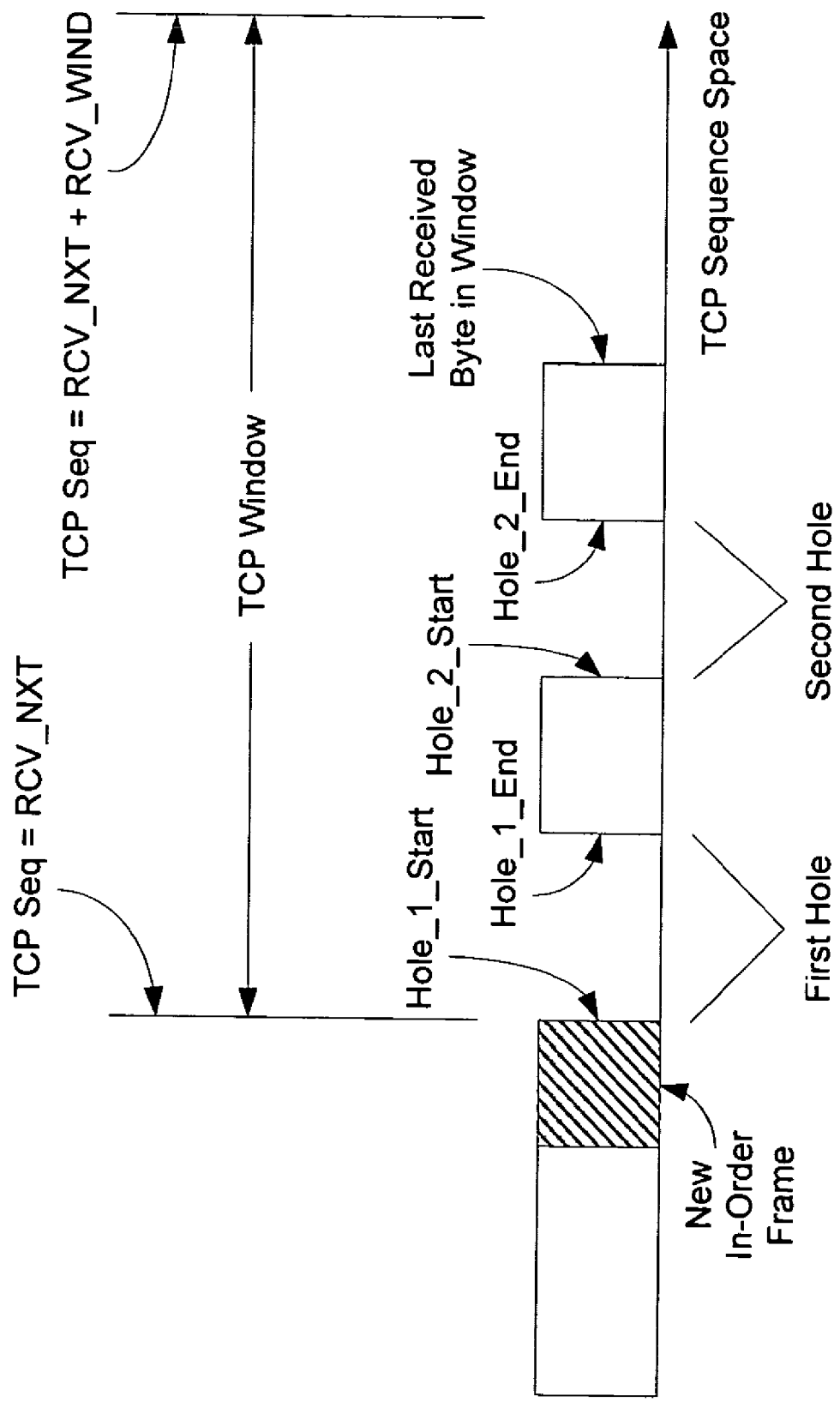

FIGS. 3A-B is a block diagram illustrating exemplary variables that may be utilized to manage various out-of-order received frame scenarios in connection with handling out-of-order frames in accordance with an embodiment of the invention. FIG. 3A shows that the TCP window already has two holes which the network subsystem 50 via, for example, the TEEC 70 is managing. In FIG. 3B, an in-order frame may be received by the network subsystem 50. The TEEC 70 may parse and may process the in-order frame. In one embodiment, control information may be separated from the data information. The TEEC 70 may process at least one of, for example, the control information, the data information and the context information to determine a location in the host memory 30 in which to place the data information. As illustrated in FIG. 3B, the placement of the data information from the in-order frame may modify the first hole and the TCP window. The first hole may be reduced in size and one or more the first hole variables may be updated. In the illustrated embodiment, the value of Hole_1_Start is increased and the value of Hole_1_End remains the same. The left edge of the TCP window may be shifted to the right by adjusting the value of RCV_NXT to accommodate the addition of the data information of the in-order frame to the front portion of the previous TCP window. In one example, the value of RCV_NXT may be increased by the value of the width in TCP sequence space of the newly placed data information of the in-order frame. In another example, the TCP window may shrink in width by the width in TCP sequence space of the newly placed data information. In yet another example, the receiver may have additional resources (e.g., buffers) and may advertise them to its remote peer, thus the TCP window may not change in width or may grow in width.

Figure 4A:
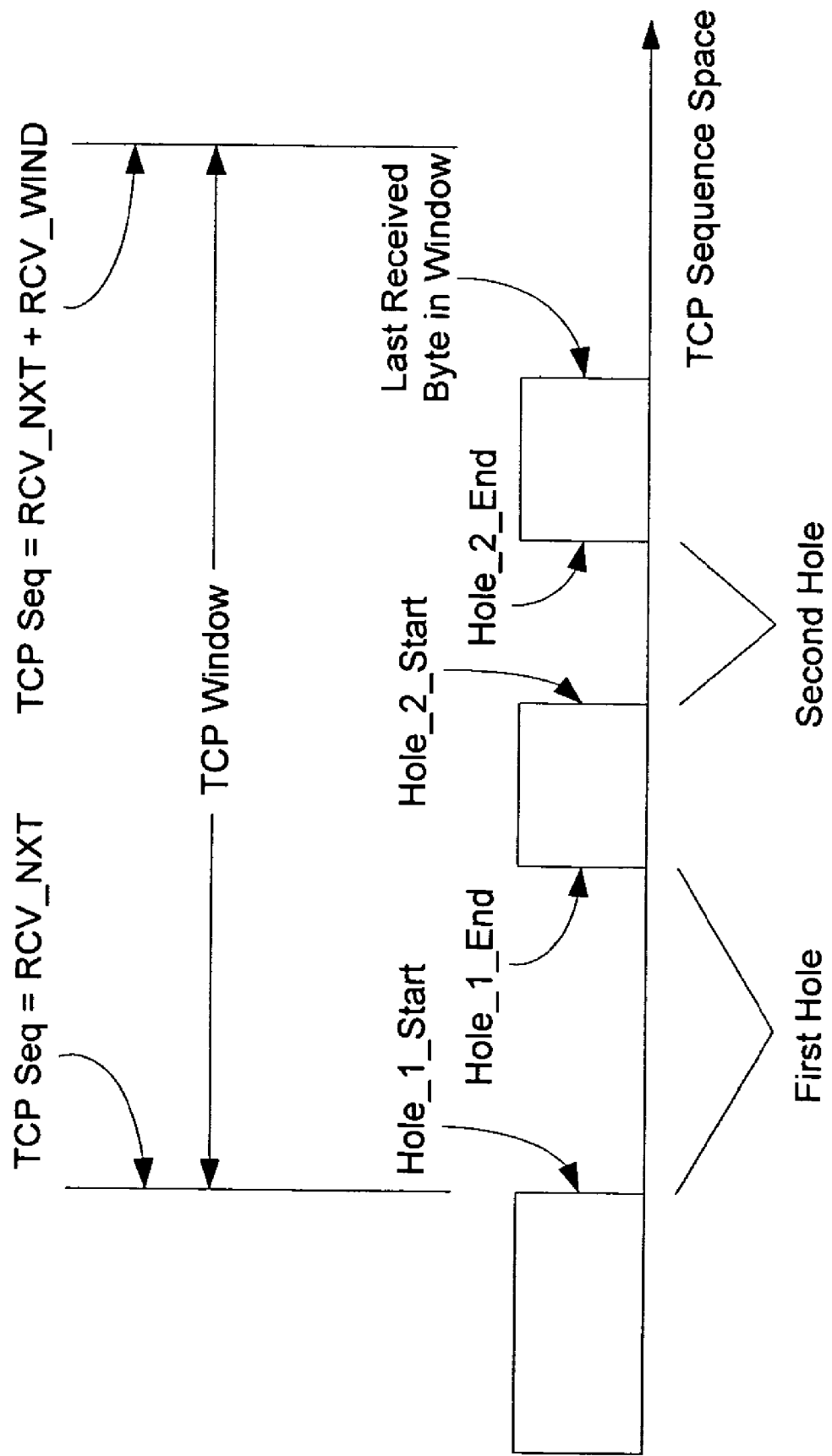
FIGS. 4A-B is a block diagram illustrating an exemplary case where a new out-of-order TCP segment is received and is adjacent to existing hole in connection with handling out-of-order frames in accordance with an embodiment of the invention.
Figure 4B:
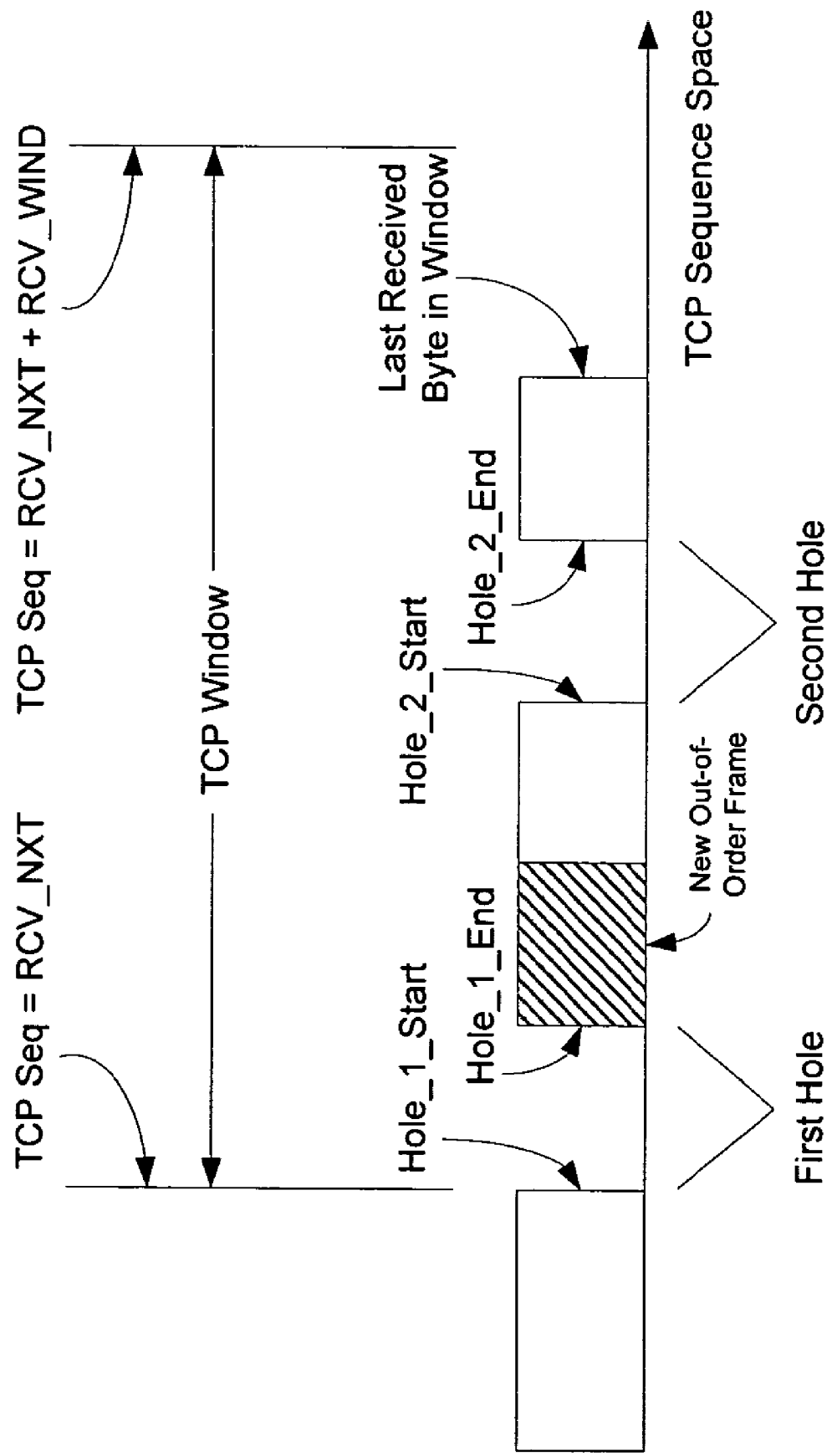

FIGS. 4A-B is a block diagram illustrating an exemplary case where a new out-of-order TCP segment is received and is adjacent to existing hole in connection with handling out-of-order frames in accordance with an embodiment of the invention. FIG. 4A shows that the TCP window already has two holes which the network subsystem 50 via, for example, the TEEC 70 is managing. In FIG. 4B, an out-of-order frame may be received by the network subsystem 50. As illustrated in FIG. 4B, the placement of the data information from the out-of-order frame may modify, for example, the first hole. The first hole may be reduced in size and one or more the first hole variables may be updated. In the illustrated embodiment, the value of Hole_1_Start remains the same and the value of Hole_1_End decreases. The TCP window may remain the same.

Figure 5A:
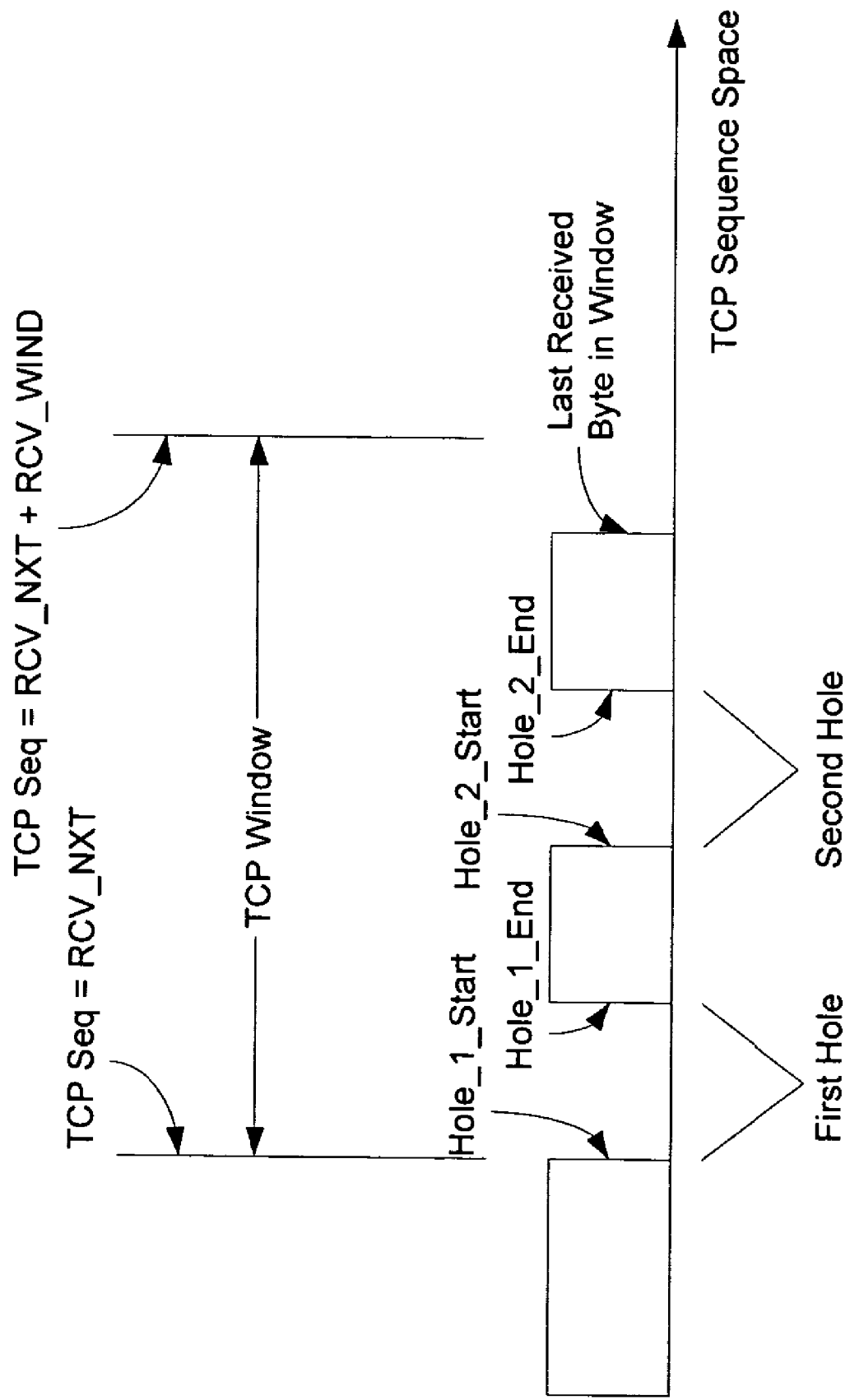
FIGS. 5A-B is a block diagram illustrating an exemplary case where a new out-of-order TCP segment is received that plugs a first hole closest to the left edge of a TCP window in connection with the handling out-of-order frames in accordance with an embodiment of the invention.
Figure 5B:
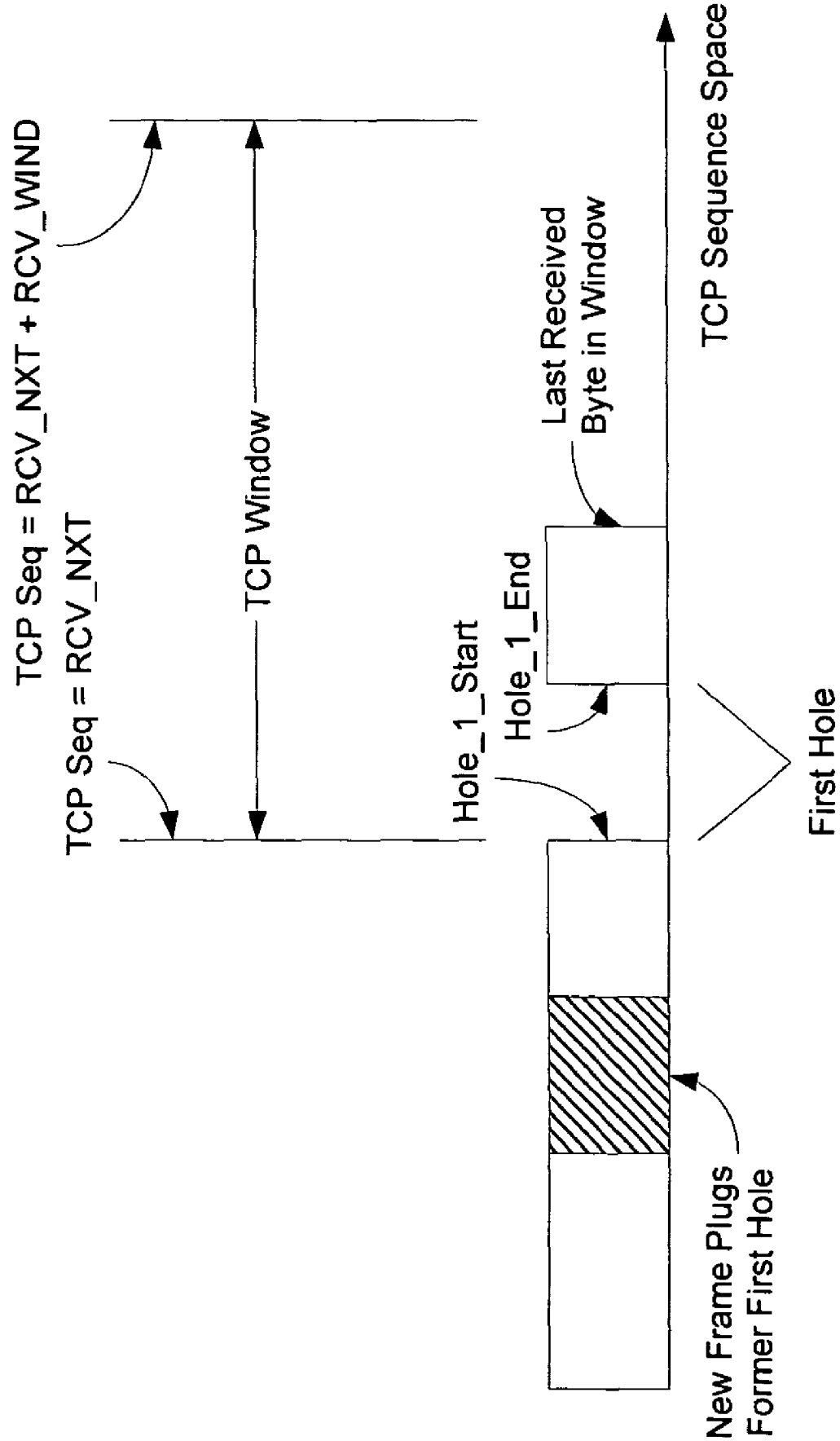

FIGS. 5A-B is a block diagram illustrating an exemplary case where a new out-of-order TCP segment is received that plugs a first hole closest to the left edge of a TCP window in connection with the handling out-of-order frames in accordance with an embodiment of the invention. FIG. 5A shows that the TCP window already has two holes which the network subsystem 50 via, for example, the TEEC 70 is managing. In FIG. 5B, an in-order frame may be received by the network subsystem 50. The placement of the data information from the in-order frame may completely plug the first hole and modify the TCP window. In the illustrated embodiment, the former first hole is completely plugged. Accordingly, the network subsystem 50 need only manage the one remaining hole. In one embodiment, the first hole variables may be deleted and the second hole variables may become the new first hole variables and the second hole variable values may become the new first hole variable values. If the TCP window included m holes, in which m is an integral value, and the first hole were plugged, then n-th hole variables, in which n is an integral value less than or equal to m, may become the new (n−1)-th hole variables and the n-th hole variable values may become the new (n−1)-th hole variable values. The left edge of the TCP window may be shifted to the right by adjusting the value of RCV_NXT to accommodate the addition of the data information of the in-order frame and the previously placed out-of-order frame(s) to the front portion of the former TCP window. In one example, the value of RCV_NXT may be increased by the value of the width in TCP sequence space of the newly placed data information of the in-order frame and the width in TCP sequence space of the previously placed out-of-order frame(s) between the former first hole and the former second hole. As described above, the TCP window may shrink in width, increase in width or remain the same width.

Figure 6A:
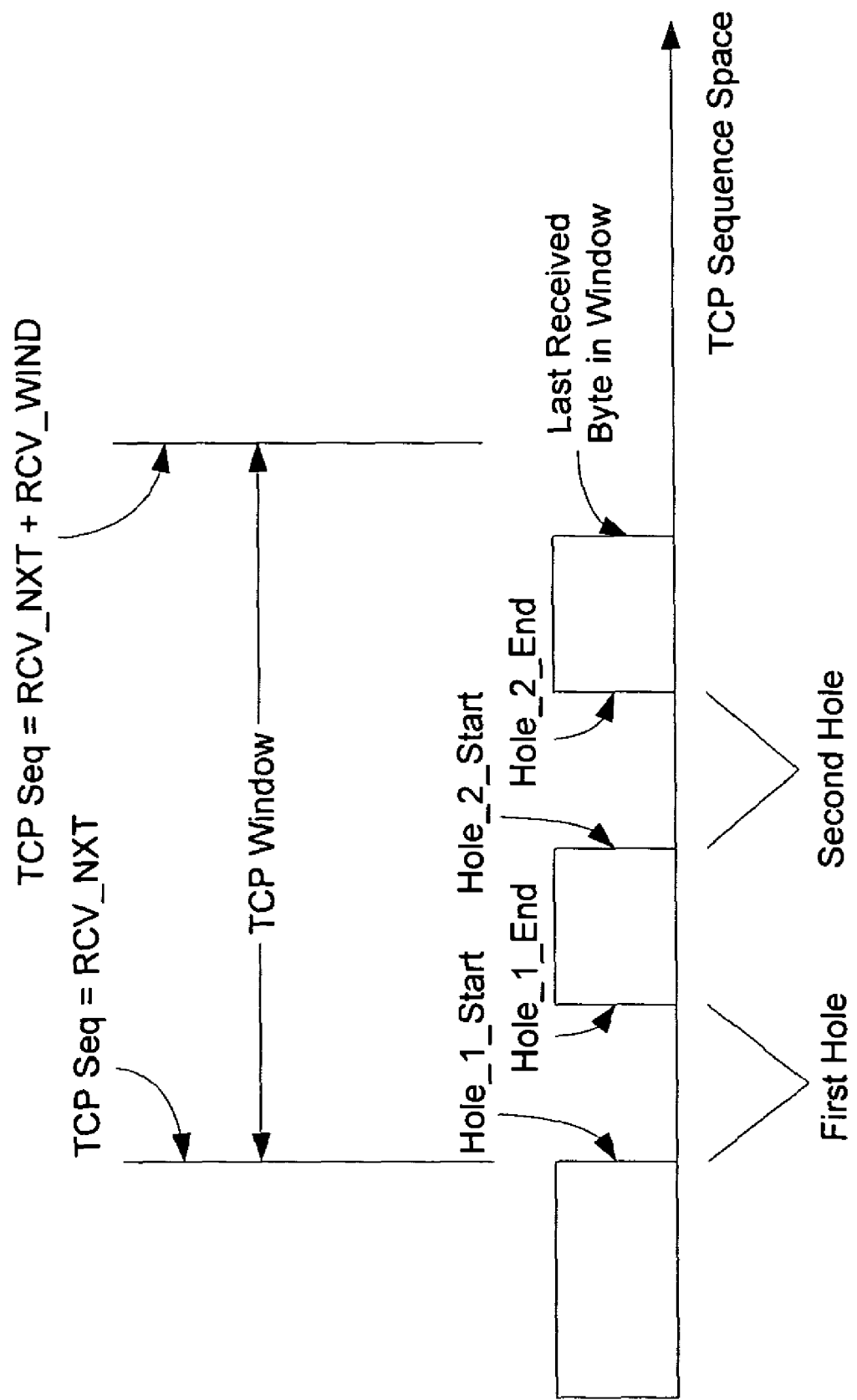
FIGS. 6A-B is a diagram illustrating a case where a new out-of-order TCP segment is received that plugs another hole in connection with the handling out-of-order frames in accordance with an embodiment of the invention.
Figure 6B:
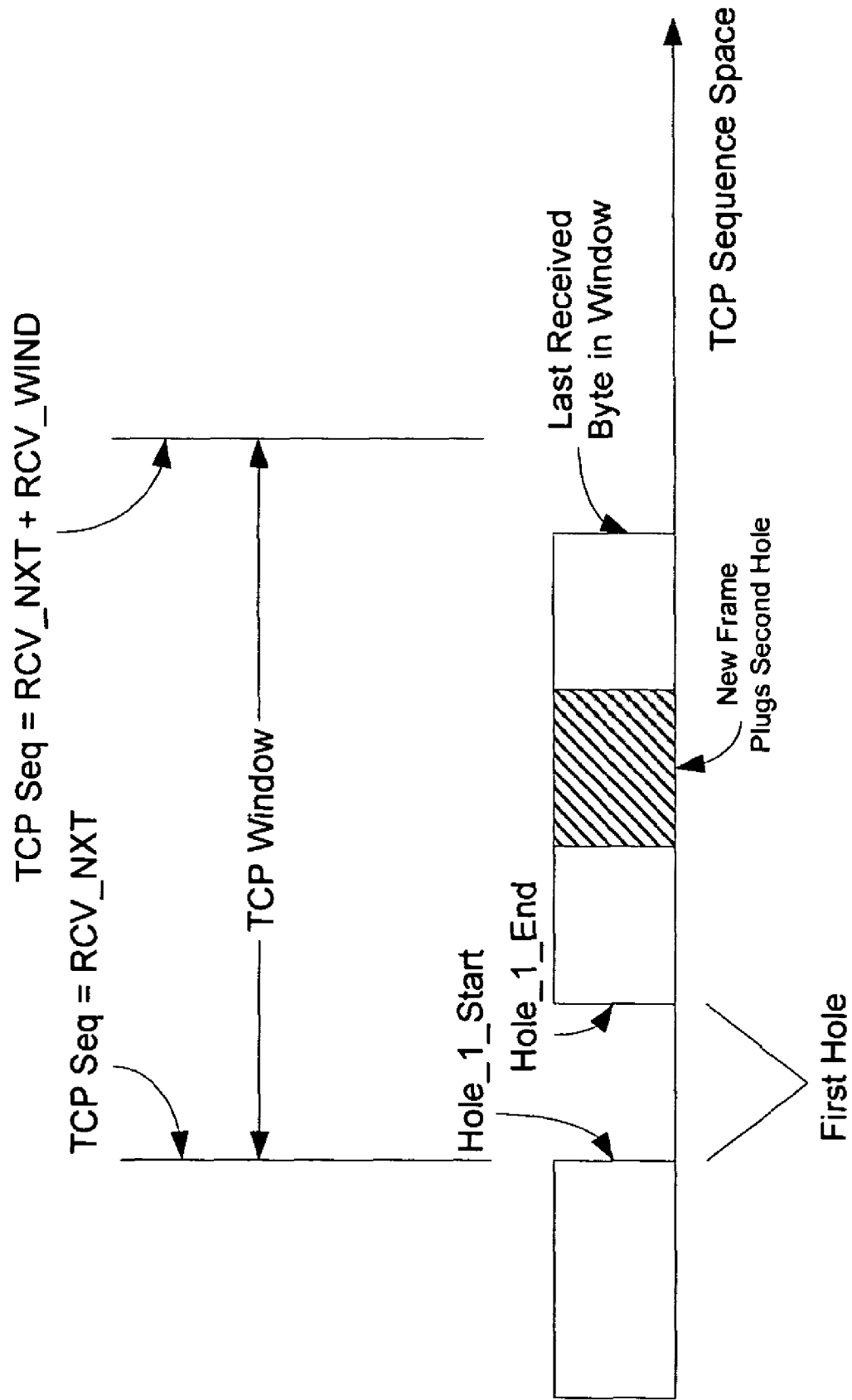

FIGS. 6A-B is a diagram illustrating a case where a new out-of-order TCP segment is received that plugs another hole in connection with the handling out-of-order frames in accordance with an embodiment of the invention. FIG. 6A shows that the TCP window already has two holes which the network subsystem 50 via, for example, the TEEC 70 is managing. In FIG. 6B, an out-of-order frame may be received by the network subsystem 50. The placement of the data information from the out-of-order frame may completely plug the second hole. Accordingly, the network subsystem 50 need only manage the one remaining hole. In one embodiment, the second hole variables may be deleted. The TCP window may remain the same.

The pseudo code, as set forth below, describes an embodiment of a process that moves data from the TCP segment to the buffer list. For simplicity the code that may cover handling the PUSH bit or that may cover the "no room in current buffer list" has been omitted. For further simplicity, the TCP situation is assumed to be static such that there may be no receive TCP window update. Another simplification is that the wrap around of the TCP sequence number space may not be addressed in the pseudo code.

```
/* global initializations */
Number_of_holes = 0;
OOO_Data {
  Begin Int32;
  End Int32;
  ULP_Event_present Boolean;      /* Variable keeps tag of
presence of ULP event in OOO segment */
  ULP_Event_TCP_Sequence_number Int32; /* TCP sequence number
for ULP event */
} OOO_list[]; /* this list of structure keeps tag of TCP seq number of
segments received o-o-o */
        /* RCV_NXT is the TCP sequence number of next
        expected byte */
1.      /* The TCP Sequence number range (TCP Seq # of the first byte
of TCP payload is First_TCP_Seq, TCP Sequence # of last byte is
Last_TCP_Seq) is checked to be within RCV window (between
RCV_NXT and RCV_NXT + TCP_Window) */
1A.     /* If frame outside the window (stale or duplicate) drop
the frame */
   if ((First_TCP_Seq > (RCV_NXT + TCP_window)) ||
(Last_TCP_Seq < RCV_NXT)) then drop_frame( );
```

```
1B. /* If some bytes have been received before, ignore duplicate bytes */
   if First_TCP_Seq < RCV_NXT then First_TCP_Seq = RCV_NXT;
1C.     /* In case some bytes are out of the window, the receiver may
drop the whole segment. Here the receiver drops the illegal bytes only */
       if Last_TCP_Seq > (RCV_NXT + TCP_window) then
Last_TCP_Seq = (RCV_NXT + TCP_window);
1D.    /* In case last data is o-o-o; do accounting. It may be a new hole or
plug a hole or be adjacent to a hole */
   if First_TCP_Seq > RCV_NXT then Number_of_holes =
Hole_accounting( );
1E. /* In case last data is in-order, it may plug a hole */
   if (First_TCP_Seq == RCV_NXT) RCV_NXT =
Last_TCP_Seq + 1; /* update of the TCP_Window
is outside the scope of this code */
       {
               if ((Number_of_Holes > 0) && (Last_TCP_Seq +1 ==
OOO_list[1].Begin)) then
                {
                       /* removes element 1, index of following
elements reduced by one */
                       Remove_OOO_list_element(1);
                       Number_of_Holes--;
                }
       }
2.      /* Find the right entry in the buffer list. Placement is oblivious to
the in-order or part of a hole issue */
               Segment_Length = Last_TCP_Seq - First_TCP_Seq;
/* Delta holds the difference in the TCP sequence number to the location
first byte of the frame. It is also the distance in the buffer space to the first
byte that ought to used to store it */
Delta = (First_TCP_Seq - RCV_NXT) /* delta from anchor */
i=0;                    /* used to dynamically point to the buffer that
corresponds to RCV_NXT */
/* Some bytes of Host_Buffer_List.Buffer[0] may have been
used already. Need to figure out how many are left */
if (Delta < (Host_Buffer_List.Buffer[0].length –
(Host_Buffer_List.Buffer[0].NXT_Addr –
Host_Buffer_List.Buffer[0].Phy_Addr)))
{
    Delta + = (Host_Buffer_List.Buffer[0].NXT_Addr –
Host_Buffer_List.Buffer[0].Phy_Addr);
}
else
{
Delta – = (Host_Buffer_List.Buffer[0].length –
(Host_Buffer_List.Buffer[0].NXT_Addr –
Host_Buffer_List.Buffer[0].Phy_Addr));
5.      Do while { Delta – (Host_Buffer_List.Buffer[i].length > 0}
{
       Delta –= Host_Buffer _List.Buffer[l].length;
i++;
}
i--;
}
6.      /* The variable i point to the l-th buffer after the first buffer,
where data posting should start at. Delta holds the offset into this buffer */
7.       Bytes_to_DMA = Segment_length;
8.       /* DMA into first buffer, syntax of DMA_Data (from address, to
address, length) */
DMA_Data (First_TCP_Seq,
Host_Buffer_List.Buffer[l].Phy_Address+
Delta, Host_Buffer_List.Buffer[l].length–Delta)
10. /* is_buffer_full has the following syntax (first_byte_written,
length) and returns 1 in case it is full */
   if (buff_full =
is_buffer–Full(Host_Buffer_List.Buffer[l].Phy_Address+
Delta, Host_Buffer_List.Buffer[l].length–Delta) ) then
return_buffer_to_owner( );
11.      Bytes_to_DMA –= Host_Buffer_List.Buffer[l].length–
Delta; /* bytes that have been DMA'd into 1st buffer */
12.      Start_TCP_Seq = First_TCP_Seq +
(Host_Buffer_List.Buffer[l].length – Delta);
/* DMA into next buffers if needed */
13.      Do while { Bytes_to_DMA > 0}
14.      {
if (Bytes_to_DMA > Host_Buffer_List.Buffer[l].Length) DMA data
(Start_TCP_Seq, Host_Buffer_List.Buffer[l].Phy_Address,
Host_Buffer_List.Buffer[l].Length)
       else DMA data (Start_TCP_Seq,
Host_Buffer_List.Buffer[l].Phy_Address, Bytes_to_DMA);
```

-continued

```
Bytes_to_DMA -= Host_Buffer_List.Buffer[l].length;
Start_TCP_Seq += Host_Buffer_List.Buffer[l].length
    l++;
    If l > max_buffers then goto no_more_buffers;
   }
}
/* Routine for accounting for in-window TCP data that is received out-of-
order. Builds o-o-o data management structures, returns number of holes
*/
int32
Hole_accounting( )
{
 /* check no duplicate of o-o-o data */
 l = 0;
 Do while ( Number_of_Holes > l )
 {
  /* For simplicity of the pseudo code the case where one TCP segment
  overlaps more than one hole is not discussed here. However it is a simple
  extrapolation of the code below */
        If ((First_TCP_Seq < (OOO_list[l].Begin) &&
(Last_TCP_Seq > (OOO_list[l].Begin) && (Last_TCP_Seq <=
(OOO_list[l].End)) then Last_TCP_seq =
(OOO_list[l].Begin;
        If ((First_TCP_Seq >= (OOO_list[l].Begin) &&
(Last_TCP_Seq <= (OOO_list[l].End)) then drop_frame( );
    If ((First_TCP_Seq >= (OOO_list[l].Begin) && (First_TCP_Seq <
(OOO_list[l].End) && (Last_TCP_Seq > (OOO_list[l].End) then
First_TCP_seq = (OOO_list[l].End;
   /* Is this data adjacent to existing hole? Move edge of hole. Is the hole
plugged now? */
        If ((First_TCP_Seq == OOO_list[l].End+1) then
        {
        OOO_list[l].End = Last_TCP_Seq;
        If (OOO_list[l].End +1 == OOO_list[l+1].Begin) then
        {
            OOO_list[l].End = OOO_list[l+1].End;
            /* removes element l+1, index of following elements reduced by
one */
            Remove_OOO_list_element(l+1);
            return (Number_of_Holes−−);
         }
        }
        If (Last_TCP_Seq+1 == OOO_list[l].Begin)) then
        OOO_list[l].Begin = First_TCP_Seq;
        If (OOO_list[l].Begin == OOO_list[l−1].End +1) then
        {
            OOO_list[l−1].End = OOO_list[l].End;
            /* removes element l, index of following elements reduced by
one */
            Remove_OOO_list_element(l);
            return (Number_of_Holes−−);
         }
        }
 /* if new hole allocate space to manage it */
        If ((First_TCP_Seq > OOO_list[l].End+1) &&
(First_TCP_Seq+1 < OOO_list[l+1].Begin)) then
            {
              /* insert element l+1 */
              Insert_OOO_list_element(l+1);
              OOO_list[l+1].Begin = First_TCP_Seq;
              OOO_list[l+1].End = Last_TCP_Seq;
              return (Number_of_Holes++);
             }
  }
}
```

The base sequence number and the host buffer info list may be updated as buffers are consumed along with the movement of the TCP Window to the right.

By accounting for missing TCP segments (e.g., holes), the data information of incoming frames may be placed in a flow-through manner into a host buffer. The data information need not be locally stored on the network subsystem 50 nor held until other TCP segments are received thereby completing an in-order set of TCP segments. This may be accomplished, for example, by splitting the control data from the data information. The data information may be stored in the host buffer and a summary of control data may be stored on, for example, the network subsystem 50. Since the network subsystem 50 is not required to support a buffer for out-of-order TCP segments, the network subsystem 50 may use a resource-efficient scalable memory to manage the control information relating to the out-of-order TCP segments. The memory for data on the network subsystem 50 may then scale with the number of holes and not with the number of frames that are out of order. Indeed, in some embodiments, the memory for data need not scale with the number of connections, the number of holes per connection or even the TCP connection, bandwidth-delay product.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein may be suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for reordering frames in a network, the system comprising:
   at least one processor operable to place data from a frame into a host memory window, wherein the frame is received out-of-order and/or fills a hole in the host memory window; and
   the at least one processor is operable to manage information relating to holes in the host memory window and operable to modify the size of the host memory window, the number of holes allowed in the host memory window, and the size of each hole.

2. The system according to claim 1, wherein the frame is received via a TCP offload engine (TOE) or a TCP-enabled Ethernet controller (TEEC).

3. The system according to claim 1, wherein the at least one processor is operable to not store the frame on an onboard memory if it is received out-of-order.

4. The system according to claim 3, wherein the at least one processor is operable to not store the frame on an onboard memory if it fills a hole in the host memory window.

5. The system according to claim 1, wherein the at least one processor is on a network interface card (NIC).

6. The system according to claim 1, wherein the at least one processor is operable to place data from the frame into the host memory window if the frame is determined to be within the limits of the host memory window.

7. The system according to claim 1, wherein the at least one processor is operable to drop the frame, if the frame is determined to be outside the limits of the host memory window.

8. The system according to claim 1, wherein the at least one processor is operable to place a portion of the data of the frame in the host memory window, wherein the portion of the data is within the limits of the host memory window.

9. The system according to claim 1, wherein the at least one processor enables one or more of:
storing information relating to a new hole created by the placement of the data of the frame,
updating information relating to an existing hole modified by the placement of the data of the frame, and/or
deleting information relating to a plugged hole created by the placement of the data of the frame.

10. The system according to claim 9,
wherein the stored information resides on a network subsystem,
wherein the updated information resides on a network subsystem, and
wherein the deleted information resided on a network subsystem.

11. The system according to claim 1, wherein the managed information resides on a network subsystem.

12. The system according to claim 1, wherein the at least one processor is operable to update the size of the host memory window based upon the placement of the data of the frame.

13. The system according to claim 1, wherein the at least one processor is operable to map TCP space into host buffer space.

14. The system according to claim 1, wherein a network subsystem comprises a memory whose memory usage scales with a number of holes in the host memory window.

15. The system according to claim 1, wherein a network subsystem comprises a memory whose memory usage does not scale with a number of frames received.

16. A method for reordering frames in a network, the method comprising:
placing data from a frame into a host memory window, wherein the frame is received out-of-order and/or fills a hole in the host memory window; and
managing information relating to holes in the host memory window, wherein managing comprises the ability to modify the size of the host memory window, the number of holes allowed in the host memory window, and the size of each hole.

17. The method according to claim 16, wherein the method comprises determining whether the frame is within the limits of the host memory window prior to placing data from the frame into the host memory window.

18. The method according to claim 16, wherein the method comprises dropping the frame, if the frame is determined to be outside the limits of the host memory window.

19. The method according to claim 16, wherein the method comprises determining whether a portion of the frame is within the limits of the host memory window prior to placing data from the frame into the host memory window.

20. The method according to claim 16, wherein managing information relating to holes comprises one or more of:
storing information relating to a new hole created by the placement of the data of the frame,
updating information relating to an existing hole modified by the placement of the data of the frame, and/or
deleting information relating to a plugged hole created by the placement of the data of the frame.

21. The method according to claim 16, wherein managing information relating to holes comprises updating the size of the host memory window based upon the placement of the data of the frame.

22. The method according to claim 16, wherein the method comprises mapping TCP space into host buffer space.

* * * * *